United States Patent
Karunamuni et al.

(10) Patent No.: US 10,681,304 B2
(45) Date of Patent: Jun. 9, 2020

(54) CAPTURING A PANORAMIC IMAGE USING A GRAPHICAL USER INTERFACE HAVING A SCAN GUIDANCE INDICATOR

(71) Applicant: Apple Inc., Cupertino, CA (US)

(72) Inventors: Chanaka G. Karunamuni, San Jose, CA (US); Gregory N. Christie, San Jose, CA (US); Scott J. Forstall, Mountain View, CA (US); Richard R. Dellinger, San Jose, CA (US)

(73) Assignee: APPLE, INC., Cupertino, CA (US)

( * ) Notice: Subject to any disclaimer, the term of this patent is extended or adjusted under 35 U.S.C. 154(b) by 1102 days.

(21) Appl. No.: 13/631,931

(22) Filed: Sep. 29, 2012

(65) Prior Publication Data

US 2013/0141524 A1 Jun. 6, 2013
US 2017/0324898 A9 Nov. 9, 2017

Related U.S. Application Data

(60) Provisional application No. 61/657,376, filed on Jun. 8, 2012.

(51) Int. Cl.
*H04N 7/00* (2011.01)
*H04N 5/232* (2006.01)
(Continued)

(52) U.S. Cl.
CPC .............. *H04N 7/00* (2013.01); *G03B 37/02* (2013.01); *G06T 3/4038* (2013.01);
(Continued)

(58) Field of Classification Search
CPC ...................................................... H04N 7/005
See application file for complete search history.

(56) References Cited

U.S. PATENT DOCUMENTS 5,402,171 A * 3/1995 Tagami ............... H04N 1/2112
 250/208.1
6,304,284 B1 * 10/2001 Dunton ................ G06T 3/4038
 348/36
(Continued)

FOREIGN PATENT DOCUMENTS

CN 101228477 A 7/2008
CN 101674409 A 3/2010
(Continued)

OTHER PUBLICATIONS

"International Application Serial No. PCT/US2013/044265, International Search Report dated Mar. 4, 2014", 7 pgs.
(Continued)

*Primary Examiner* — Chikaodili E Anyikire
(74) *Attorney, Agent, or Firm* — Invoke

(57) ABSTRACT

A method and apparatus for facilitating the capturing of panoramic images with a portable device. Such panoramic images are typically formed of multiple image portions taking as the camera is scanned through a range of motion, and the image portions are digitally "stitched" together to form a panoramic image. A user interface is provided to guide a user in positioning and/or moving of the portable device in a manner that will enable capture of a plurality of images suited for forming the intended panoramic image. In many examples, parameters of the panoramic image capturing operation, such as movement and/or positioning of the camera during the operation will be monitored in real time, and the monitored parameters will be used to provide feedback to the user as to any adjustments that may improve the image capture process.

17 Claims, 27 Drawing Sheets

(51) Int. Cl.
*G06T 3/40* (2006.01)
*G03B 37/02* (2006.01)
*H04N 1/387* (2006.01)

(52) U.S. Cl.
CPC ..... *H04N 5/23238* (2013.01); *H04N 5/23293* (2013.01); *H04N 1/387* (2013.01)

(56) References Cited

U.S. PATENT DOCUMENTS

| | | | |
|---|---|---|---|
| 7,450,839 B2 | 11/2008 | Lee et al. | |
| 7,746,404 B2 | 6/2010 | Deng et al. | |
| 7,796,871 B2 | 9/2010 | Park et al. | |
| 2004/0189849 A1* | 9/2004 | Hofer | G03B 37/04 348/333.03 |
| 2007/0025723 A1 | 2/2007 | Baudisch et al. | |
| 2007/0147812 A1 | 6/2007 | Nenonen et al. | |
| 2008/0074506 A1* | 3/2008 | Oh | G03B 37/04 348/218.1 |
| 2008/0204566 A1* | 8/2008 | Yamazaki | G03B 5/00 348/208.99 |
| 2009/0021576 A1* | 1/2009 | Linder | G03B 37/00 348/36 |
| 2009/0058990 A1 | 3/2009 | Kim et al. | |
| 2010/0066810 A1* | 3/2010 | Ryu | H04N 5/232 348/36 |
| 2010/0066910 A1 | 3/2010 | Kataoka | |
| 2011/0058015 A1 | 3/2011 | Moriyama et al. | |
| 2011/0211038 A1 | 9/2011 | Noguchi et al. | |
| 2011/0304688 A1* | 12/2011 | Ge | G03B 37/04 348/36 |
| 2012/0075412 A1 | 3/2012 | Miyamoto et al. | |
| 2013/0050407 A1* | 2/2013 | Brinda | G03B 37/02 348/38 |

FOREIGN PATENT DOCUMENTS

| | | |
|---|---|---|
| CN | 102037719 | 4/2011 |
| CN | 102420938 A | 4/2012 |
| EP | 1628474 A2 | 2/2006 |
| JP | 2009-244369 A | 10/2009 |
| JP | 2011-114500 A | 6/2011 |
| WO | WO-2007/071821 A1 | 6/2007 |
| WO | WO-2013/184767 A2 | 12/2013 |

OTHER PUBLICATIONS

"International Application Serial No. PCT/US2013/044265, Written Opinion dated Mar. 4, 2014", 10 pgs.

"International Application Serial No. PCT/US2013/044265, International Preliminary Report on Patentability dated Dec. 18, 2014", 12 pgs.

"International Application Serial No. PCT/US2013/044265, Invitation to Pay Additional Fees and Partial Search Report dated Jan. 8, 2014", 6 pgs.

Daoqiang Zhao, "108 techniques for digital camera photographing", 2007, pp. 173-176. (English translation of relevant portion "The block on left top of p. 174" is provided).

Wang Shigao, "1200 Troubleshooting for Popular Digital Application", 2004, p. 51, 6 pages (2 pages of English translation and 4 pages of Original document).

Liu et al., "Digital Photography: Elementary to Proficient", 2004, p. 123, 7 pages (2 pages of English translation and 5 pages of Original document).

* cited by examiner

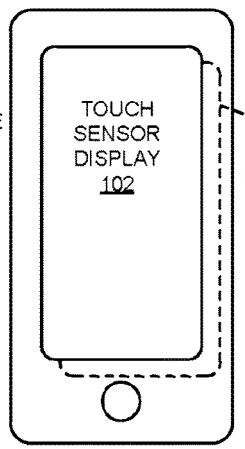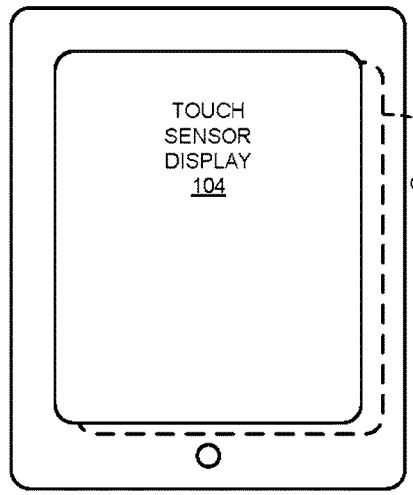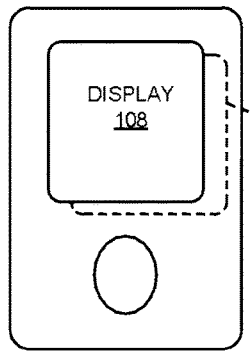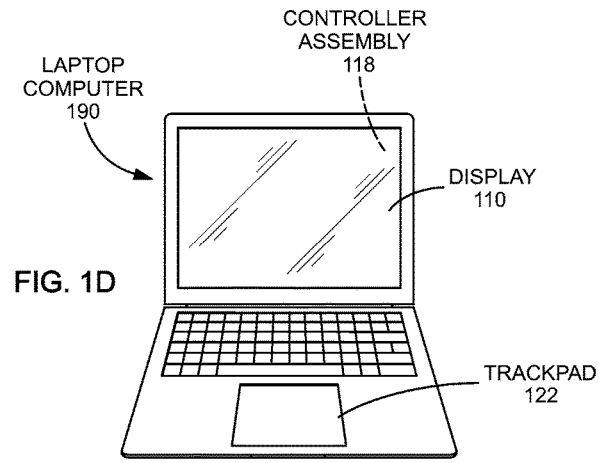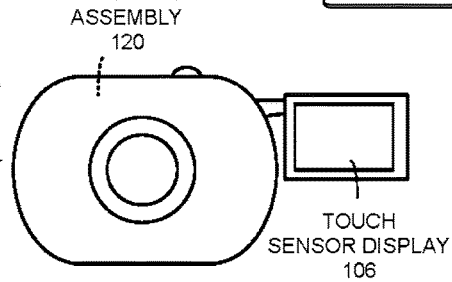

CAPTURING A PANORAMIC IMAGE USING A GRAPHICAL USER INTERFACE HAVING A SCAN GUIDANCE INDICATOR

CLAIM OF PRIORITY

This application claims the benefit of priority under 35 U.S.C. § 119(e) to U.S. Patent Application Ser. No. 61/657,376, filed Jun. 8, 2012, which is hereby incorporated by reference herein in its entirety.

TECHNICAL FIELD

The present disclosure relates generally to methods and apparatus for capturing panoramic images, and in particular relates to such methods and apparatus providing a user interface ("UI") to facilitate capturing the panoramic images.

BACKGROUND

A panoramic image is an image that has at least one dimension that is substantially wider (for example by a factor of 2× or 3×, or more) in one direction (e.g., typically the horizontal direction) than in another direction (e.g., the vertical direction). Though from a functional perspective, a captured image that encompasses a field of view that is greater than that of the camera by which the image was captured (and thus must be formed from multiple captured images) can be considered a panoramic image. Panoramic images can be captured using a dedicated camera device or a camera assembly included in a mobile device, such as a tablet, smartphone, computer, etc. (collectively referred to herein as a "camera device"). In some systems, a panoramic image may be captured through use of a rotating mechanism in or supporting a camera device to facilitate direct capture of panoramic images. Alternatively, a pseudo panoramic image may be captured through use of a panoramic lens structure. However, rotating mechanisms are expensive and tend to be bulky; and panoramic lenses typically provide less than ideal image quality.

Another way to capture panoramic images is by capturing a series of conventional digital images as the camera is scanned past the subject matter of interest, and digitally combining the images to form a panoramic image. In this technique, the camera device is typically moved in a continuous fashion by a user, and operates to sequentially capture a series of images that can be combined to define a panoramic image. The current methods and apparatus are directed to solving problems resulting from such capturing of panoramic images by moving the camera device. In such systems, the user moves the camera device, for instance, in a lateral or horizontal direction, or rotates the camera device about a pivot point. All of the images which will collectively define the ultimate panoramic image are typically acquired during a single scan of the camera device through a range of movement. If at least one image is incompletely captured within the series of images including the panoramic image, then either an incomplete (corrupted) panoramic image, or no panoramic image, will result. Image correction or estimation software may not be able to fully compensate for the incomplete portions of the image.

In such cases, it may be user error, not device error, resulting in corrupt (or missing) panoramic images. Most commonly, such corrupt or missing images result from the user operating the camera device in a manner that prevents the camera device from capturing each of the images necessary to combine to form the panoramic image. Thus, it would be beneficial to provide a user with instructions and guidance to facilitate proper operation of a camera device for acquisition of the digital images necessary to form panoramic images. Because the appropriate operation by the user will in some cases depend on the system being used and/or the parameters of the image being captured, it would also be beneficial, in some embodiments, to factor in device constraints present during the image capture process to facilitate guiding the user for proper acquisition of images. And in some embodiments, it would be beneficial to provide user instructions and guidance that are easy for a user to understand and that will intuitively correspond to the image capture in progress.

BRIEF SUMMARY

The present disclosure describes various embodiments of systems, methods, and apparatus to facilitate the capturing of panoramic images with a portable device. In various embodiments as described herein, a user interface is provided to give feedback to a user to guide positioning and/or movement of the portable device in a manner that will enable capture of a plurality of images suited for being digitally "stitched" together to form a panoramic image. In many embodiments, as described herein, parameters of the panoramic image processing operation, such as, for example, movement and/or positioning of the camera during the operation, will be monitored in real time (i.e., during the image capture process), and the monitored parameters will be used to provide feedback to the user as to any adjustments that would improve the capture process. In many embodiments, this feedback will be non-textual, or will at least include non-textual visual elements, and/or other non-textual indicators to the user.

Other features and aspects of the invention will become apparent from the following detailed description, taken in conjunction with the accompanying drawings which illustrate, by way of example, the features in accordance with embodiments.

BRIEF DESCRIPTION OF THE DRAWINGS

Some embodiments are illustrated by way of example and not limitations in the figures of the accompanying drawings, in which:

FIGS. 1A-1E depict example portable devices having a camera according to some embodiments.

FIG. 2A depicts a conceptual diagram of a panoramic image to be captured using the portable device according to some example embodiments; while

DETAILED DESCRIPTION

Figure 2A:
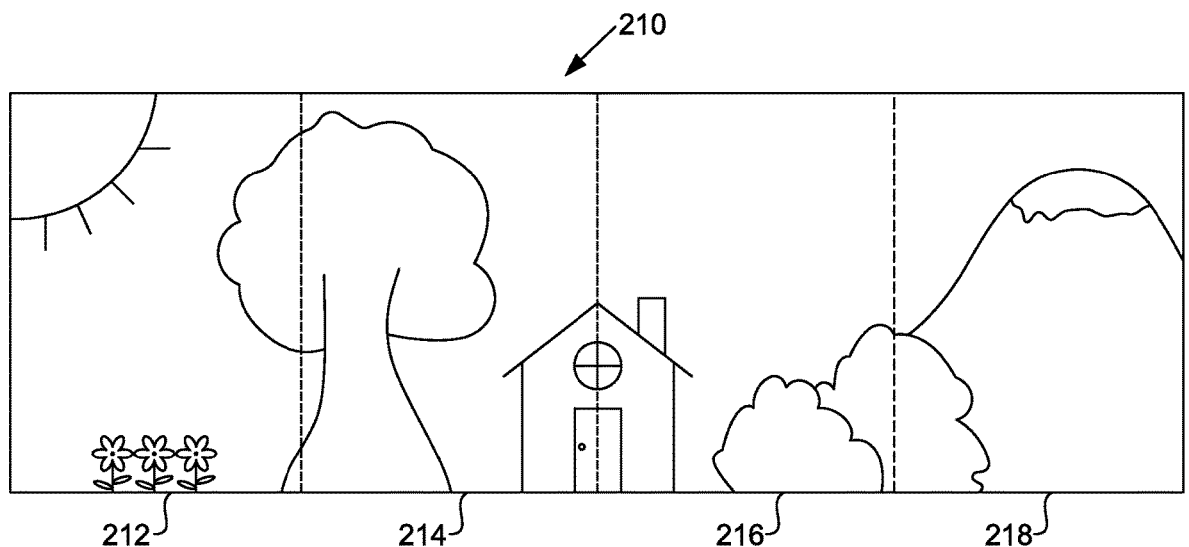

The following detailed description refers to the accompanying drawings that depict various details selected to show examples of how the new methods and apparatus may be practiced. The discussion addresses various examples of the inventive subject matter at least partially in reference to these drawings, and describes the depicted embodiments in sufficient detail to enable those skilled in the art to practice the new methods and apparatus. Many other embodiments may be utilized for practicing the inventive subject matter than the illustrative examples discussed herein, and many structural and operational changes in addition to the alternatives specifically discussed herein may be made without departing from the scope of the inventive subject matter.

In this description, references to "one embodiment" or "an embodiment," or to "one example" or "an example" mean that the feature being referred to is, or may be, included in at least one embodiment or example of the invention. Separate references to "an embodiment" or "one embodiment" or to "one example" or "an example" in this description are not intended to necessarily refer to the same embodiment or example; however, neither are such embodiments mutually exclusive, unless so stated or as will be readily apparent to those of ordinary skill in the art having the benefit of this disclosure. Thus, the present invention can include a variety of combinations and/or integrations of the embodiments and examples described herein, as well as further embodiments and examples as defined within the scope of all claims based on this disclosure, as well as all legal equivalents of such claims.

For the purposes of this specification, a "processor-based system" or "processing system" as used herein, includes a system using one or more microprocessors, microcontrollers and/or digital signal processors or other devices having the capability of running a "program," (all such devices being referred to herein as a "processor"). A "program" is any set of executable machine code instructions, and as used herein, includes user-level applications as well as system-directed applications or daemons.

FIGS. 1A-1E depict example portable devices having an image capture unit, each including an image capture device (such as a charge coupled device (CCD) imager, a CMOS imager, etc.), in combination with other components used to capture image data (such as one or more lenses operatively arranged with the imager, etc.), and devices to provide at least basic image processing functionality. Such basic image processing functionality includes, but is not necessarily limited to, processing the captured image data sufficient to retain that data in a buffer or longer term memory storage such that the processed data can be retrieved for further processing to form a single panoramic image. Such basic image processing, as well as additional image processing can, in some examples, be performed by the imager itself). Thus, each portable device a "camera device," as used herein.

The following are just a few examples of devices that may incorporate the new methods and apparatus as disclosed herein. The example portable devices include: a mobile telephone or smart phone 100, a portable tablet 150, an audio/video device 170 such as a multimedia display device, a personal computer 190 such as a laptop or netbook, a camera 195, and any variety of mobile devices that include an image capture unit (e.g., a camera), display, and gyroscope. Each of the mobile telephone/smart phone 100, portable tablet 150, audio/video device 170, laptop computer 190, and camera 195 will include a display (which in each of the examples of FIGS. 1A, 1B and 1E, is depicted as a touch sensor panel 102, 104, 106; though each may also be a simple video display, as depicted in the example of FIGS. 1C and 1D, as 108 and 110, respectively). As will be apparent to those skilled in the art, for most of the devices of FIGS. 1A-1E, the devices will include image capture units on a surface opposite the displays depicted in the figures. While some devices may include an additional image capture unit, facing in the same direction as the display, in most cases, an opposite-facing image capture unit will be used to obtain the panoramic images. An example of such a device is depicted in FIG. 2C.

Each device will also include a controller assembly 112, 114, 116, 118, 120 which will include at least one processor. Each of the mobile telephone/smart phone 100, portable tablet 150, audio/video device 170, personal computer 190, and camera 195 can also include other components, such as one or more of the following: a power button, a menu button, a home button, a volume button, a light flash source for the camera unit, one or more input/output jacks or connectors, and/or other components to operate or interface with the device. A block diagram of an example portable device 200 is provided in FIG. 7, and discussed in relation thereto.

Figure 2B:
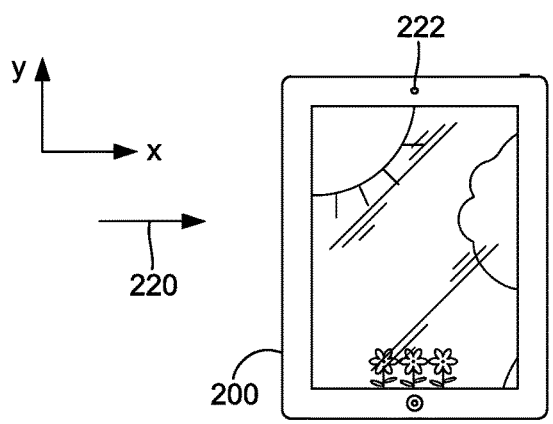
FIG. 2B depicts an example portable device that may be used to capture the image, depicted from a front view.
Figure 2C:
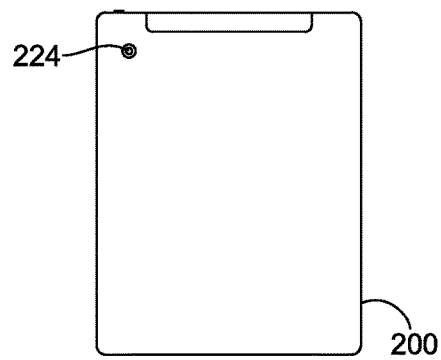
FIG. 2C depicts the example portable device of FIG. 2B depicted from a rear view.

FIG. 2A depicts a conceptual diagram of a panoramic image 210 to be captured using the portable device 200 according to some embodiments. The example portable device 200 includes two image capture units (222 in FIG. 2B, and 224 in FIG. 2C), in combination with conventional control and processing circuitry as is known in the art for capturing and processing image data. As noted above, the rear-facing image capture unit, as shown at 224 in FIG. 2C, will typically be used to capture the panoramic images, while the user views the UI on the opposite-facing display. The particular configuration of the portable device 200 may dictate the location of the image capture unit on the device. The processing required by the image capture unit may be provided at least in part by the system processor; but more commonly will be handled by a dedicated processor either within the image capture chip or assembly, or otherwise associated therewith.

To capture a panoramic image, a user moves the portable device 200 through a particular scan path relative to an object or scene of interest in order to acquire the imaging data corresponding to the object or scene of interest. The scan path traversed by the portable device 200 is typically either generally horizontal (i.e., in a left to right direction or a right to left direction) or generally vertical (i.e. from up to down, or down to up). An example scan direction 220 shown in FIG. 2 includes a scan path along the x-axis in the left to right direction; and will often include a component that is not co-linear with a plane formed by the x- and y-axes. For example, the user may move the portable device 200 in a semi-circular path that is in the scan direction 220 and also has a rotational component, typically around a vertical axis located somewhere along a line extending between a vertical axis extending through some portion of the portable device and a vertical axis through the user supporting the portable device; though it is possible that the user could move in an arc, thereby putting the axis somewhere behind the user.

The panoramic image 210 includes two or more images captured by the portable device 200 that are digitally stitched together to form a single composite image. As shown in FIG. 2, the panoramic image 210 includes a first image 212, a second image 214, a third image 216, and a fourth image 218 (each an "image portion," and collectively the "image portions"). The portable device 200 sequentially and continuously captures the image portions 212, 214, 216 and 218, respectively, as the portable device 200 traverses the scan path 220. Although four image portions are depicted, it should be understood that the number of image portions, or the width of any one of the image portions, may be different from that shown in FIG. 2. The field of view of the lens associated with the image capture unit will typically determine, in part, the maximum width of a given image portion that can be acquired. However, capturing a greater of image portions, with each representing a difference from the prior image portion that is a relatively narrow "slice" (relative to a full frame view), is believed to provide higher image quality, due to more overlapping image data. Such capture of a relatively greater number of image portions than the minimum that would be required (where each image portion is close to a full field of view frame) will require relative greater processing bandwidth and greater memory capacity, because there are more images, with greater overlap of image content, to be stitched together to form the panoramic image. Accordingly, such greater granularity in the capturing of image portions can impact the maximum safe scanning speed, and potentially the maximum dimension of the panoramic image. In some embodiments, no discrete image portions may be discernible within the panoramic image 210 because the image capture is continuous over the particular scan path. In any case, the panoramic image 210 has a substantially wider view along the x-axis than along the y-axis. Alternatively, the dimension of panoramic image 210 may be substantially greater along the y-axis than along the x-axis.

As will be apparent from consideration of the image portions 212, 214, 216 and 218, the full frame of each image portion will not be able to be stitched to the subsequent image portion unless the portable device 200 was in the same vertical position at the time of capture of both such image portions, and was also in the same angular orientation at the time of capture of both such image portions. In the case of a panoramic image with the extended dimension in the vertical direction, the portable device 200 would need to be held in the same horizontal position, though the angular orientation will typically change. An additional factor in the obtaining of suitable panoramic images is that the portable device be moved at a speed such that each image portion can be fully captured.

Figure 3:
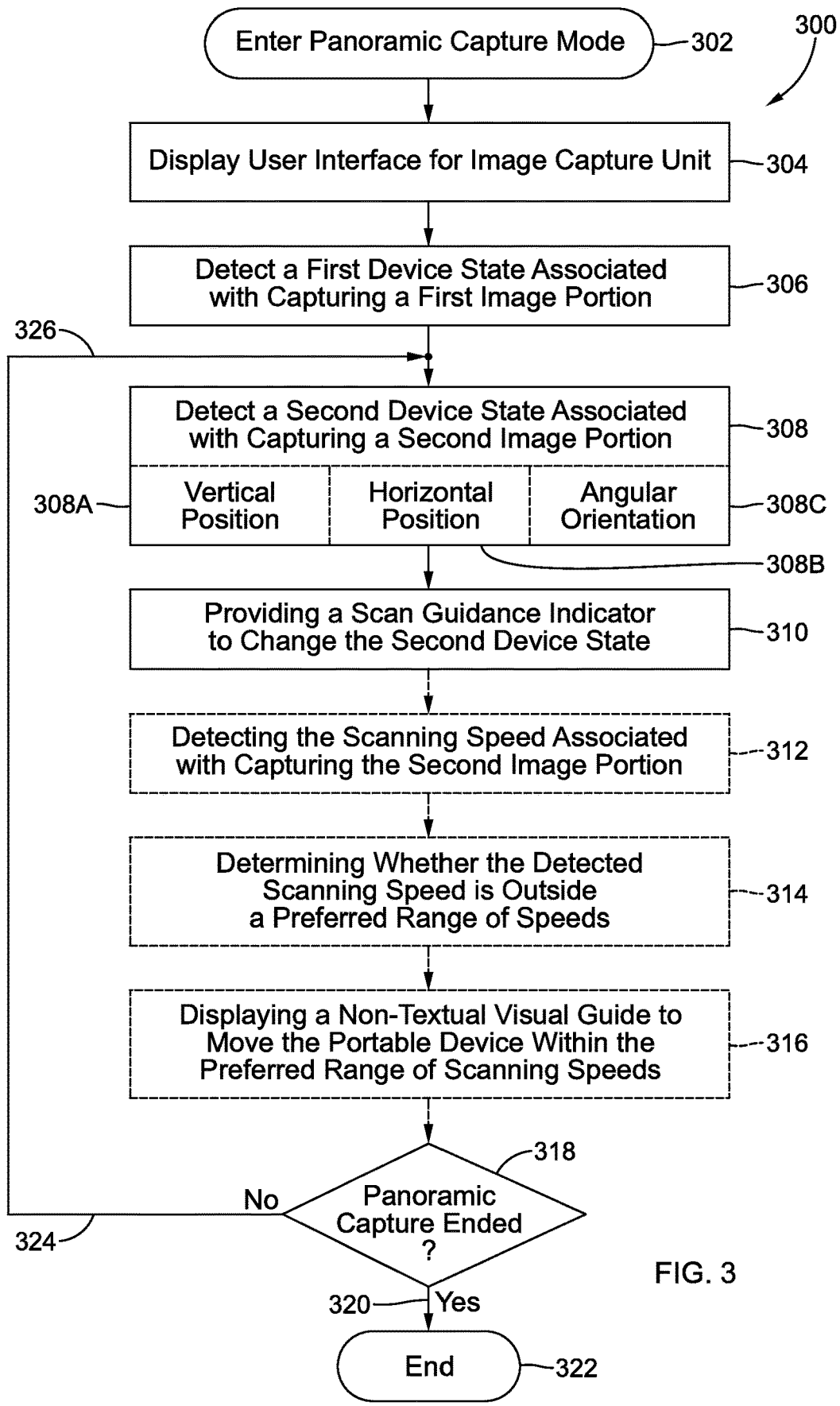
FIG. 3 depicts an example flow diagram for obtaining a panoramic image through use of a panoramic image capture user interface to provide guidance to a user to facilitate the image capture process.

FIG. 3 provides a flowchart 300 of one example method for obtaining a panoramic image through use of a panoramic image capture user interface ("UI") to provide appropriate guidance to a user to facilitate the image capture process. Once the portable device 200 that will be used to obtain the panoramic image is operated to enter the panoramic capture mode at 302, the system will display a user interface for the image capture unit, at 304. The user interface can be presented in a variety of forms, some examples of which are provided herein in FIGS. 6A-U. Proximate the time of capture of a first image portion, at least a first device state will be detected, at 306. In many embodiments, this first device state will be used as a baseline reference to guide the capture of subsequent image portions. In some embodiments, device states of multiple parameters will be detected for later reference.

During the panoramic image capture process, after the first image portion has been captured, the system will detect a second device state associated with capturing the second image portion, at 308. The second device state may be selected from multiple parameters, including, for example, the vertical position of the portable device (308A), the horizontal position of the portable device (308B), or the angular orientation of the portable device (308C). In at least some embodiments, the second device state will be determined prior to actual capture of the second image portion. In the event that the determined second device state indicates that a change of position of the portable device (200) would be beneficial to the panoramic image capture process, then a scan guidance indicator will be provided through the displayed user interface indicating the appropriate change of the second device state. For example, if it were determined that the vertical position of the portable device had been elevated after the capture of the first image portion, a scan guidance indicator to lower the vertical position could be provided through the user interface.

In some embodiments, additional guidance can be provided. As an example, additional optional steps 312, 314 and 316, indicated by dashed lines, are also depicted in FIG. 3. In the provided example of additional optional steps, the system determines the scanning speed (i.e., the speed at which the portable device is being moved) proximate the time of capturing the second image portion, at 312. The system will then determine if the detected scanning speed is outside of a preferred range of scanning speeds, at 314; such that the scanning speed might adversely affect the panoramic image capture process. If that determination is made, then a visual guide including non-textual elements will be displayed on the display of the portable device to guide the user to move the portable device at a speed within the preferred range of speeds. Multiple examples of such non-textual visual guides are provided in FIGS. 6A-Q later herein.

A determination will next be made, at 318 as to whether the panoramic capture process has ended, such as by a user activating a control to stop the capture. Alternatively, the panoramic capture process could be ended automatically, such as by the system determining a movement of the portable device inconsistent with capturing the panoramic image, such as the user stopping movement of the portable device for a predetermined duration, or by significantly changing the orientation of the portable device, such as if the device is significantly lowered or tilted. If the panoramic capture process has ended, at 320, then the process will terminate, at 322. If the panoramic capture process has not ended, at 324, then the process will return to repeat the detection as indicated at 308 and 310 (and any optional steps) until the image capture process does end at 320. Of course, if the optional operations as indicated at 312-316 are not performed, determination of 318 will be performed immediately after the operation indicated at 310. In many embodiments, the detected device state associated with capturing the first image portion, as determined at 306, will be used as a reference for capturing all subsequent image portions. However, as an alternative method of operation, the device state proximate the time of capture of any subsequent image portions might be referenced to the detected device state proximate the time of the immediately preceding image portion. In this method of operation, the reference value would always be associated with the capture of the immediately preceding image portion, rather than the first image portion.

Figure 4:
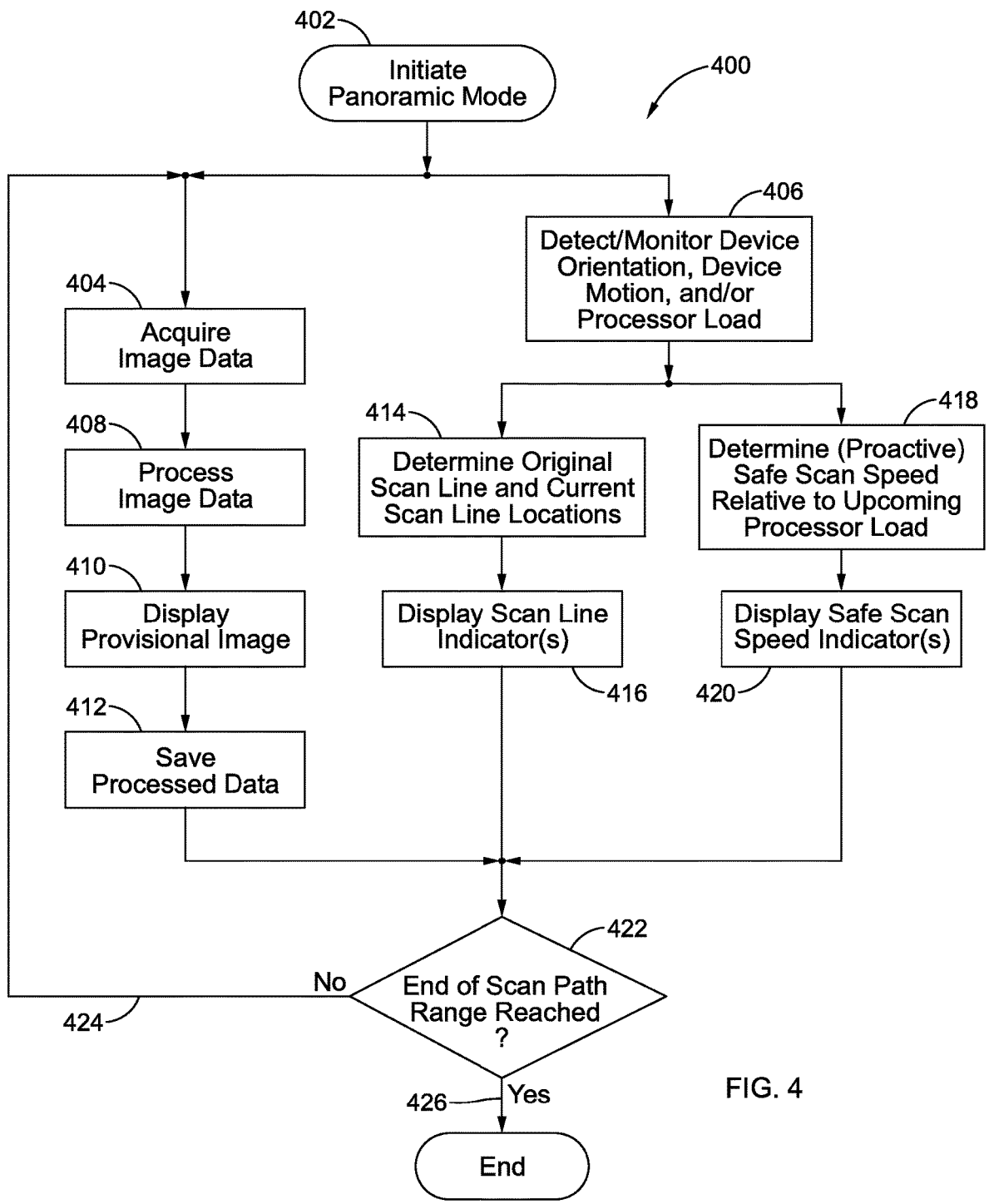
FIG. 4 depicts an example flow diagram for providing a panoramic image capture user interface (UI) according to some example embodiments.
Figure 5:
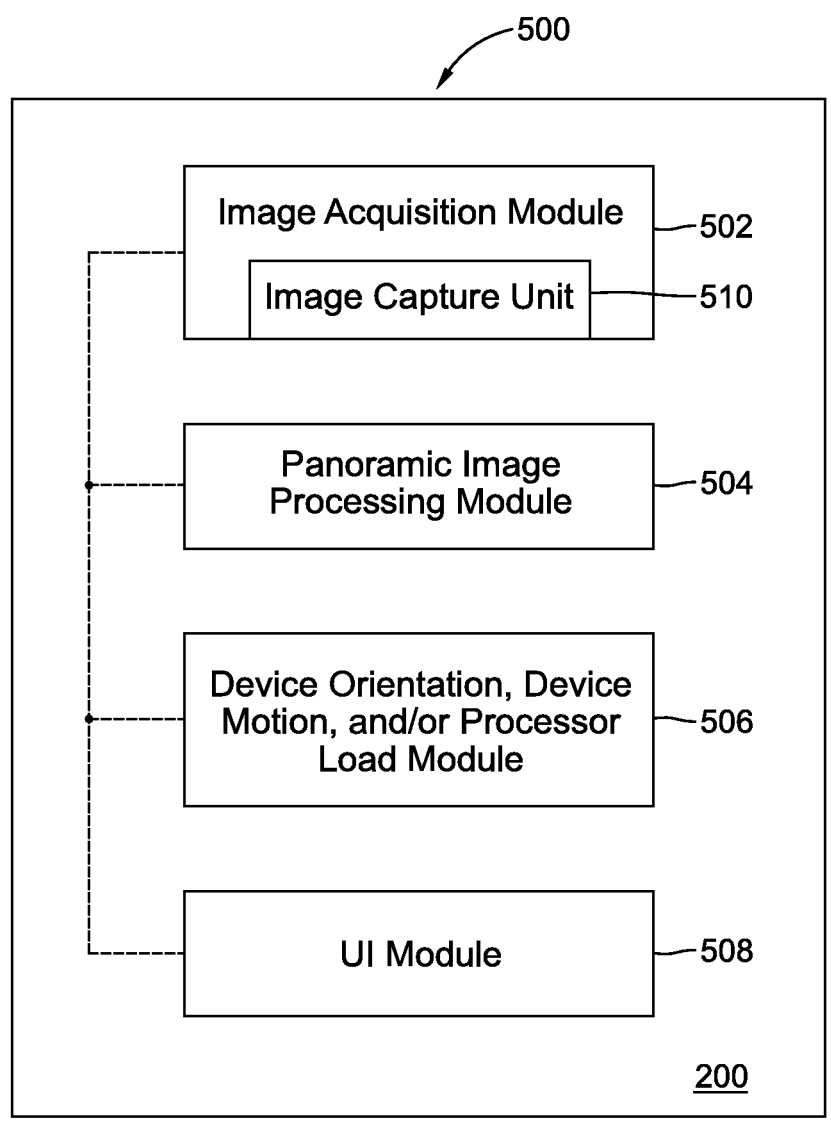
FIG. 5 depicts a block diagram showing example modules included in the portable device for implementing the panoramic image capture UI according to some example embodiments.
Figure 6A:
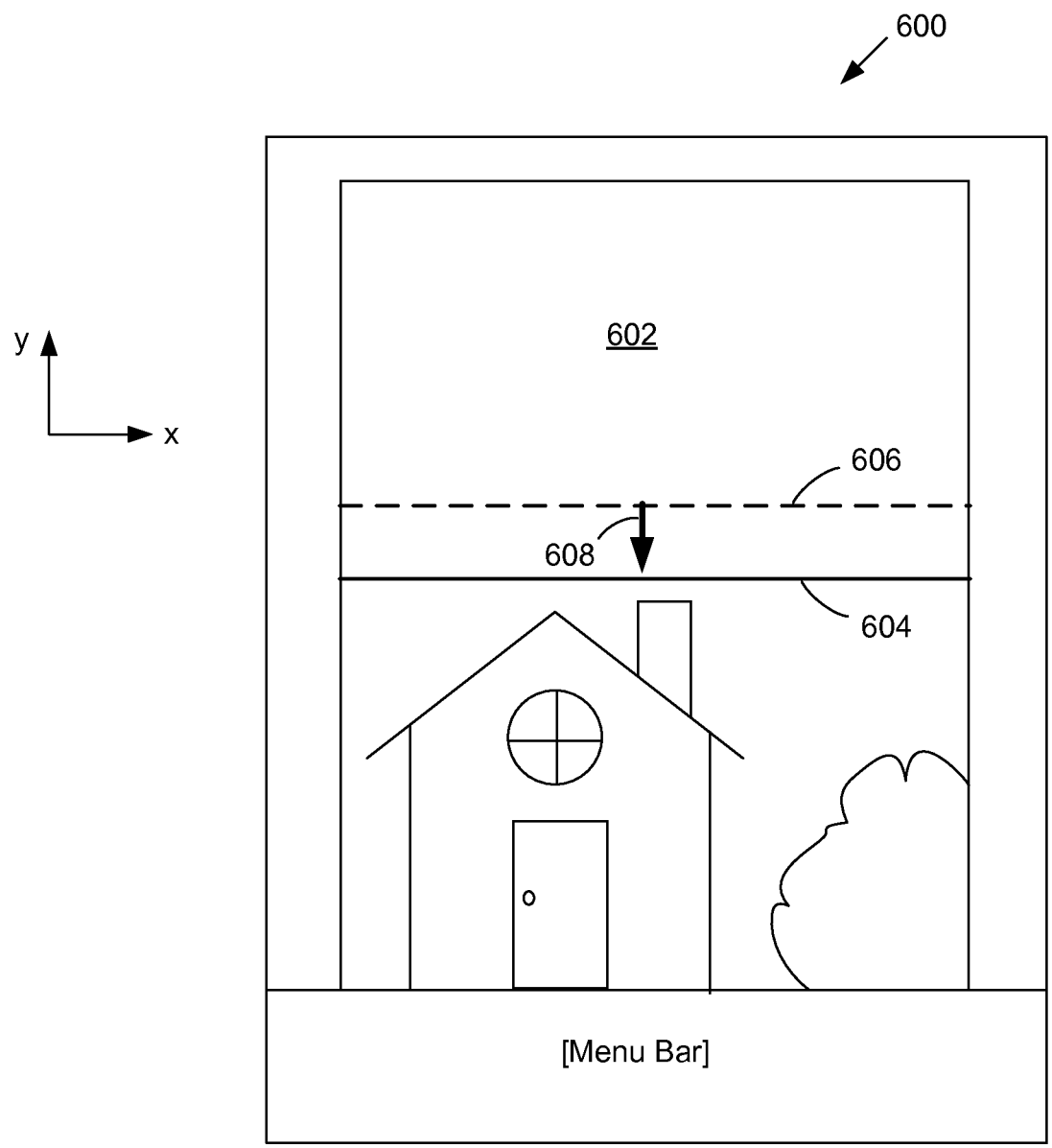
FIGS. 6A-6U depict example UI screens provided on the display of the portable device for facilitating panoramic image capture in accordance with some example embodiments.

Referring now to the structure and operation of the system, FIG. 4 illustrates an example flow diagram 400 for obtaining a panoramic image according to some embodiments. FIG. 5 illustrates a block diagram showing example modules 500 included in an example portable device 200 for implementing the panoramic image capture UI. FIGS. 6A-6Q illustrate example UI screens corresponding to a viewfinder or other display screen of the portable device 200 in accordance with the flow diagram 400 and modules 500. FIGS. 4, 5, and 6A-6Q are described below in conjunction with one another.

Addressing first the structure of the portable device in reference to FIG. 5, the components 500 of this example portable device 200 include an image acquisition module 502, a panoramic image processing module 504, a device orientation, device motion, and/or processor load module 506, and an UI module 508. Although modules 502-508 are shown as distinct modules in FIG. 5 for ease of understanding, it should be understood that modules 502-508 may be implemented as fewer or more modules than shown. For example, in some systems, the functionality of panoramic image processing module 504 may be implemented partially, or entirely, by the image capture unit 510 of image acquisition module 502.

In most embodiments, the modules 500 will include one or more software components, programs, applications, apps, or other units of code base or instructions configured to be executed by one or more processors included in the portable device 200 (e.g., processor 102) to provide the functionalities or operations of one or more embodiments of a panoramic image capture. In such cases, the modules 500 may be part of, or separate from, a camera app (or appropriate image capture app) included in the portable device 200. In many cases, one or more of the modules will also include one or more additional hardware components (in addition to the machine-readable media containing the executable instructions), as will be apparent to persons skilled in the art. For example, image acquisition module 502 will include the image acquisition unit 510 for capturing images, as well provide desired additional functionality for controlling the image acquisition unit, such as either virtual or hardware-implemented controls, such as: control buttons to initiate (and in some cases end) image capture; controls to zoom the field of view; lighting controls, etc.; and will provide inputs to control image capture unit 510, as necessary.

Referring now to an example process flow as depicted in the flow chart of FIG. 4, a user activates the image capture unit (e.g., the camera) of the portable device 200 or launches a camera application (or other appropriate image capture application) included in the portable device 200. The portable device 200 provides the user the option to choose between one or more image capture modes such as a conventional photograph mode and panoramic photograph mode. The selection of panoramic mode may be made, for example, through a virtual button displayed on a touch screen of the portable device (see, for example, FIG. 6U). The portable device 200 may also provide one or more image configuration settings such as, but not limited to, specifying resolution, color, or black and white photographs, high dynamic range (HDR) imaging, any of which can also be selected or unselected through a virtual button on a touch screen, in a similar manner. Of course, where the portable device does not include a touch screen, other conventional buttons or other controls may be used for the selection/unselection. When the user selects the panoramic mode, the portable device 200 is configured to initiate or start the panoramic mode of operation to acquire a panoramic image (block 402).

Next at block 404, the user positions the image capture unit of the portable device 200 to capture a (first) portion (i.e., a "first image portion") of the object or scene of interest, and initiates the image capture (such as by actuating a real or virtual button). The image acquisition module 502 is thereby configured to acquire that first image portion 302 (in FIG. 3) (e.g., to acquire at least a first portion of the panoramic image 300). The user positions and (ideally) continuously moves the portable device 200 along a panoramic scanning path (e.g., along scan direction 210 in FIG. 2) to capture the image data corresponding to the object/scene of interest. Such positioning and continuous movement is also referred to in the art as scanning, panning, or traversing a scan (or scanning) path. The portable device 200, through continuous movement along the panoramic scan path, correspondingly brings new portions of the object/scene of interest within the field of view of the image capture unit. In turn, new image data corresponding to such new portions of the object/scene of interest is continuously acquired by the portable device 200. The acquisition of image data in block 404 occurs essentially continuously, in the same context that a video image is continuously acquired by capturing a plurality of frames, such as in increments of a selected number of image frames per second, and in essentially real-time; though in capturing a panoramic image, the rate of capturing frames may typically be substantially less than in capturing video images. Additionally, in the case of a panoramic image, the entire panoramic image will be viewable at a single time, unlike the multiple discrete frames of video images.

As image data is being acquired, at block 404, in many systems, the module 506 is configured to receive sensor data, and to then detect or monitor one or more of various device state parameters in response to that data, at block 406. One or more sensors (832 in FIG. 7) (such as e.g., a gyroscope, an accelerometer, an angular orientation sensor, etc.) included in the portable device 200 is each configured to provide device state information such as, but not limited to, device orientation or device motion information. Such device orientation information may include detecting the amount of up/down movement of the portable device 200 in the y-direction during the panoramic image capture process. The device orientation information may also include detecting the amount of tilt of the portable device 200 relative to an x-y plane during the panoramic image capture process. Device motion information includes detecting the scan speed or velocity in the x-direction (the scan direction 220) during the panoramic image capture process.

In many embodiments, module 506 is also configured to track the current processor load or capacity, and also preferably to project an impending processor load or capacity that may impact the device's ability to capture the panoramic image. The processor load, as used herein, includes the image processing capability of the portable device 200, particularly of the processor(s) handling the image processing, and also includes other processing demands occurring during image capture which would impact image processing, such as, but not limited to, servicing other applications, handling communications, etc.; and also includes any limitations on available memory capacity for the captured image portions, such that the memory can become full if the processor cannot process the stored images quickly enough to free space in the memory to enable image capture. In most embodiments, it is preferable that the device orientation, device motion, and/or processor load monitoring occurs generally continuously, such as at periodic intervals, and in real-time (i.e., during the scanning and image capture operation).

Returning to the acquire image data branch of the flow diagram 400, the acquired image data of block 404 is processed by the panoramic image processing module 504 at block 408. The acquired image data can be processed by the processor 102. In some embodiments the image processing may also include this further processing, including stitching successive image portions together in real-time so that the panoramic image is generated on the fly. In other embodiments, the image processing may include conversion of the received image data into a form suitable for display on the portable device 200 (e.g., preliminary image conversion), with final processing occurring later, such as after conclusion of the image data acquisition for the complete panoramic image.

Next, at block 410 a provisional or viewfinder image is displayed. In performing this operation, the UI module 508 is configured to display, on the display 110 of the portable device 200, an image portion representative of the most current image portion being captured. Such image portion may be the image portion corresponding to the acquired image data of block 404. Processing block 408 may occur simultaneously with, and continue after, the display of a provisional image (block 410).

The displayed image portion may be referred to as a provisional image or a viewfinder image, because the image portion may be rendered as an approximation of the final image that is sufficient to serve a viewfinder function to guide a user to capture the subject matter of interest. For example, the provisional image may be provided at a lower resolution than that of the final image. The provisional image is presented to the user to serve as real-time feedback of the object/scene being captured by the portable device 200. As an example, FIG. 6A illustrates an example screen 600 showing a provisional image 602 displayed on the portable device 200. As the portable device 200 is moved, the provisional image 602 is updated accordingly to provide to the user a current visual guide of the scene being captured.

The processed image data is stored at block 412. The processed image data is stored for further actions, which may include, for example, one or more of: further processing, to await the next segment of the panoramic image, or transmission to another device, etc.

Concurrent with the image acquisition, processing, and display operations, the device state information detected at block 406 is used to provide an intuitive UI to further facilitate image capture. At block 414, the module 506 is configured to determine an original or initial scan line location representative of a position on the y-axis at the start of image capture for a given panoramic image. The original scan line location corresponds to the vertical position of the portable device 200 at the start of image capture (i.e., the initial scan path vertical position). In some embodiments this initial vertical position will include vertical orientation, such as an angle of tilt of the portable device relative to a horizontal or vertical axis. This original scan line location position remains constant for a given panoramic image. The module 506 is also configured to determine a current scan line location (also referred to as a current scan line position) representative of a position on the y-axis at the current traversal point of the scan path. As the user moves the portable device 200 along the scan path for a given panoramic image, the portable device 200 can move up or down relative to the original scan line location, or can tilt relative to that original scan line location. Such up or down, or tilting, deviation will typically lead to a less than optimal panoramic image, because such deviation has the effect of narrowing the continuous portion of the image relative to a conventional rectangular display format. Accordingly, in some embodiments, such up or down movement during panning, relative to the initial scan line position, and/or tilting, is indicated on the display during image capture (block 416), and preferably is indicated, at least in part, by non-textual indicators. In some embodiments, some textual indicators might be used in combination with non-textual indicators.

The screen 600 of FIG. 6A shows example non-textual visual indicators (images, prompts, or cues) provided with the provisional image 602 to guide the user in vertical positioning of the portable device during scanning. The visual non-textual indicators can be provided as a layer over the provisional image 602 in varying degrees of translucency. For example, the non-textual indicators can be 100% opaque or less than 100% opaque (i.e. translucent). In some embodiments, the non-textual indicators relating to vertical position guidance will include an original scan line location indicator 604, a current scan line location indicator 606, and a vertical position corrective indicator 608. The location of the current scan line location indicator 606 relative to the original scan line location indicator 604 can change over time as the location of the detected current scan line relative to the original scan line location correspondingly changes over time. The current scan line location indicator 606 can be located above, coincident with, or below the original scan line location indicator 604. Scan line location indicators 604 and 606 can be displayed to the user at all times (though, at the beginning of a scan, the current scan line indicator 606 can be either invisible or coincident with original scan line indicator 606). In other examples, neither line might be displayed to a user (or only the original scan line indictor line might be displayed) until there is a deviation needing correction by the user. The vertical position corrective indicator 608 is configured to indicate to the user to move the portable device 200 up or down, as appropriate, to reposition the portable device 200 back to the original scan line location. FIG. 6A shows the vertical position corrective indictor 608 as a downward pointing arrow because the current scan line location indicator 606 is positioned above the original scan line location indicator 604. Alternatively, the vertical position corrective indictor 608 may be of any of a variety of conceivable elements that will convey to a user the necessary movement. As just a few examples of many possible such indicators, the position corrective indicator may be static, such as a constant arrow oriented to depict the direction of needed movement; or may be of many possible forms of active or animated indicators, such as, e.g., a blinking arrow, a color-changing arrow, a set of chevrons in continuous or sequential motion in the desired direction (for example, where indicators corresponding to the scan line location indicators 604 and 606 are present, the chevrons or other indictors can extend between the current scan line location indicator 606 and the original scan line location indicator 604).

The current scan line indicator 606 can be determined in response to one or more sensors. For example, placement of the current scan line indicator could be responsive just to movement in a vertical plane, as might be derived from an accelerometer measurement. However, the greater risk to vertical positioning of the image is currently believed to be unintended tilting of the portable device by a user. Accordingly, in some embodiments, the position of the current scan line indicator 606 will be based upon input from a tilt sensor, such as a gyroscope, as well as a sensor for vertical positioning. Of course, in some embodiments, only the tilt sensor measurement might be used to determine the position of the current scan line indicator 606. Where both types of measurements are relied upon in determining the placement of the current scan line indicator 606, in some embodiments greater weighting will be given the tilt measurements, in view of the potential for tilt to have a greater negative impact on the image capture process.

Additionally, in some embodiments other non-visual indicators can also be used with (or possibly in place of) the visible UI, such as audible signals or some form of haptic feedback. For example, an audio signal of a given tone or volume can be presented when the current scan line begins to deviate from the original scan line (whether or not the scan line indicators 604 and 606 are displayed to a user), and may then be modified such as moving up in intensity (such as by moving higher in pitch or volume) if the deviation between the scan lines increases; and by analogously moving down in intensity as the deviation is corrected. In some embodiments, haptic pulses may be applied to the portable device surface, again changing in frequency and/or intensity in response to the degree of deviation between the scan lines.

In this manner, the portable device 200 provides intuitive UI elements in real-time to assist the user to properly position the portable device 200 with respect to the scanning path during capture of a panoramic image (which will often, but not necessarily, be a vertical position). UI elements are configured as gaming-like elements for the user to "play" getting the two scan line indicators (indicators 604 and 606) as close as possible to each other during the image capture process. It should be understood that not all embodiments will necessarily include a separate position corrective indicator (as depicted at 608). For example, the user could just be motivated to move the camera such that the two scan line indicators (indicators 604 and 606) align with one another. However, if the user is uncertain as to the necessary direction of movement, there could be undesirable movement in the incorrect direction as the user determines the needed direction of movement. Therefore, in many embodiments the UI will benefit from the presence of a position corrective indicator.

At block 418, the module 506 is configured to determine a scanning or panning speed in the horizontal direction (x-direction) at which the processor 102 can handle the image processing of the acquired image data (and other processor demands) without unnecessarily slowing down scanning (since the user would generally want to capture the panoramic image as quickly as possible). In some such embodiments, the module 506 is configured to predict the upcoming processor load to determine a (proactive) safe scanning speed at which the image can be captured without image data acquisition exceeding the image processing capability of the portable device 200, as discussed earlier herein. The image processing capability may also depend on factors such as, but not limited to, image resolution (the lower the resolution, the less processing may be required), the amount of jitter or shaking by the user during image acquisition, and the like. If the image data acquisition—which is a function of the scanning speed—exceeds the image processing capabilities/speed, then the resulting panoramic image can contain image gaps or no panoramic image may be possible. The determined scanning speed anticipates the upcoming image processing capacity to prevent missing gaps in the handling of the image data; it is not reacting to the image processing capability already having been exceeded or approaching overcapacity point to caution the user to slow the scanning speed. The determined scanning speed may be a maximum safe scanning speed (which of course may include some safety margin built into the determined speed). Alternatively, the determined speed might be a target speed within a range of acceptable speeds that will allow suitable and efficient image capture; or the determined speed might just be a range of acceptable speeds.

In some embodiments, the system may not seek to calculate a scanning speed, but may rely on a predetermined threshold scanning speed that is determined at a value believed to allow image capture suitable for forming panoramic images. Such a system, however, will not be able to specifically address any conditions, such as of processor loading, which might cause performance outside of the expected parameters originally used to determine the threshold scanning speed.

Once the maximum safe scanning speed has been determined, the UI module 508 is configured to display non-textual indicators to direct a user to provide the determined scanning speed (or a speed within a determined range of scanning speeds) of the portable device 200 during the image capture process (block 420). The non-textual visual indicators can be static, animated, color changing, etc. The determination block 418 and display block 420 will often occur continuously in real-time.

Again, these non-textual visual indicators can be provided as a layer over the provisional image 602 in varying degrees of translucency. For example, the non-textual indicators, images, or cues can be 100% opaque or less than 100% opaque. Such non-textual indicators can also be provided anywhere relative to the provisional image 602—an overlay superimposed over a top, middle, bottom, or other portion of the provisional image 602. In other embodiments, the non-textual indicators associated with the preferred scan speed can be provided in a top region of the screen while the provisional image 602 is provided in a screen region below the top region (or vice versa). These and other UI configurations are contemplated in the present disclosure.

Figure 6B:
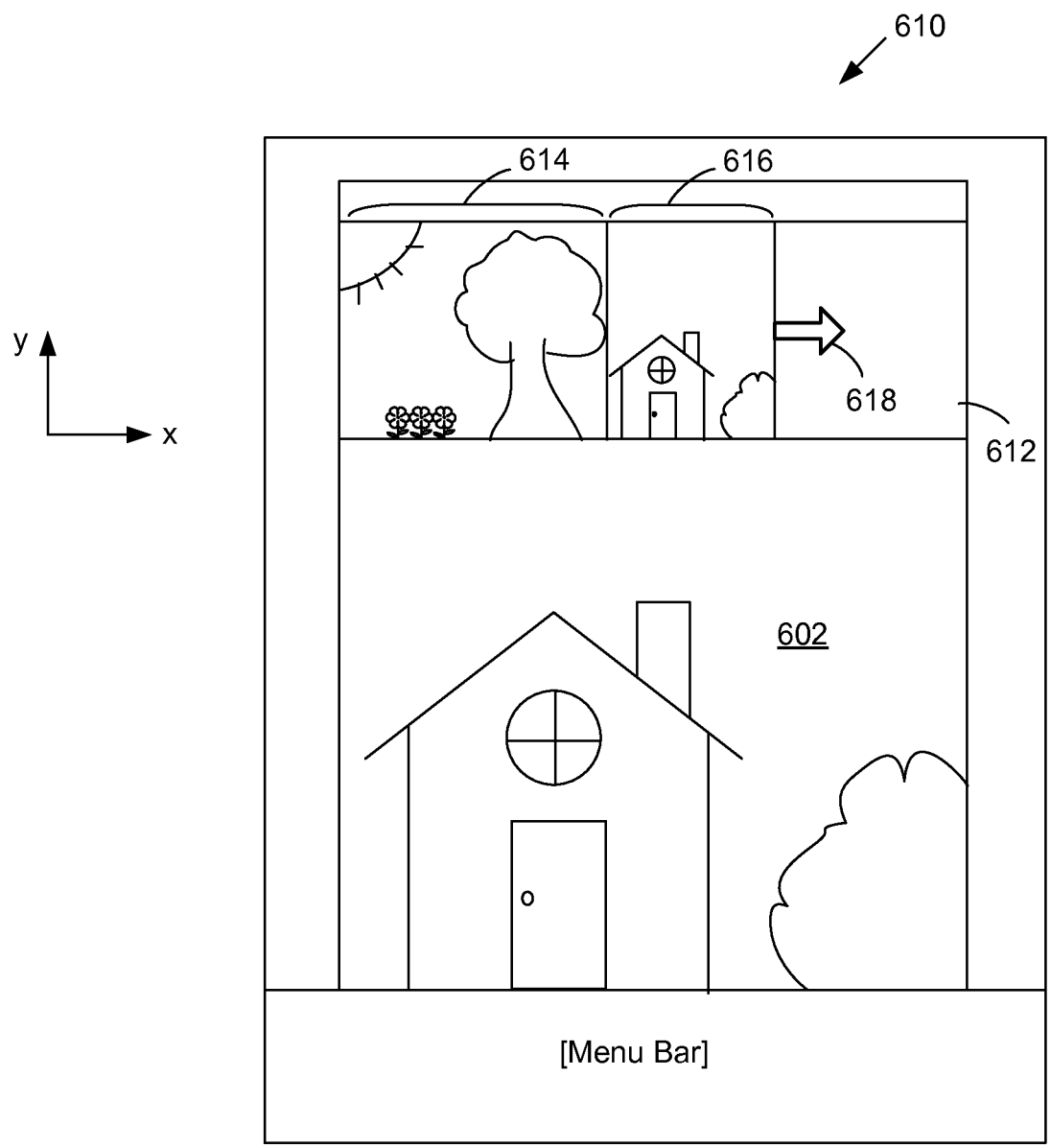
Figure 6C:
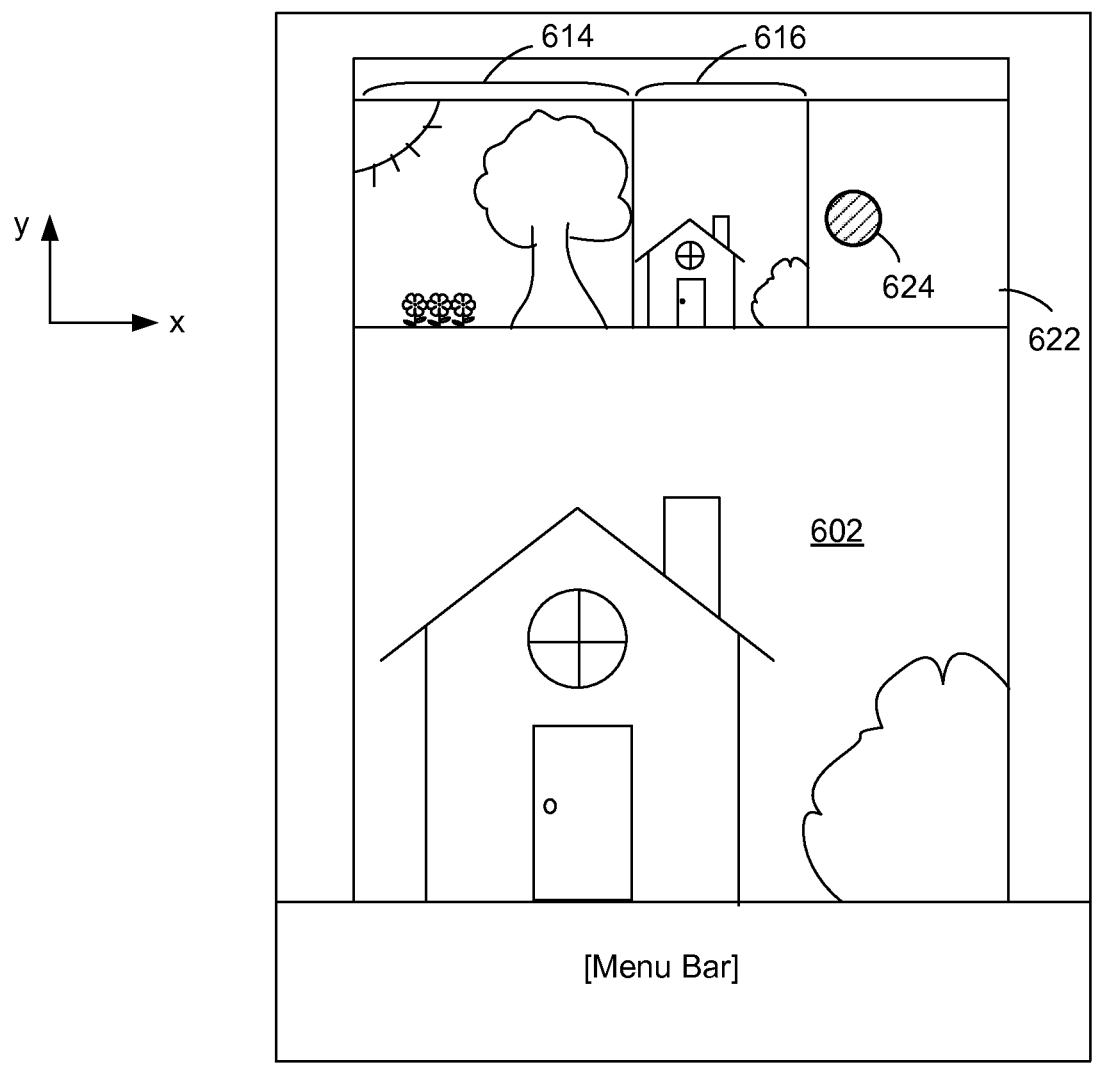
Figure 6D:
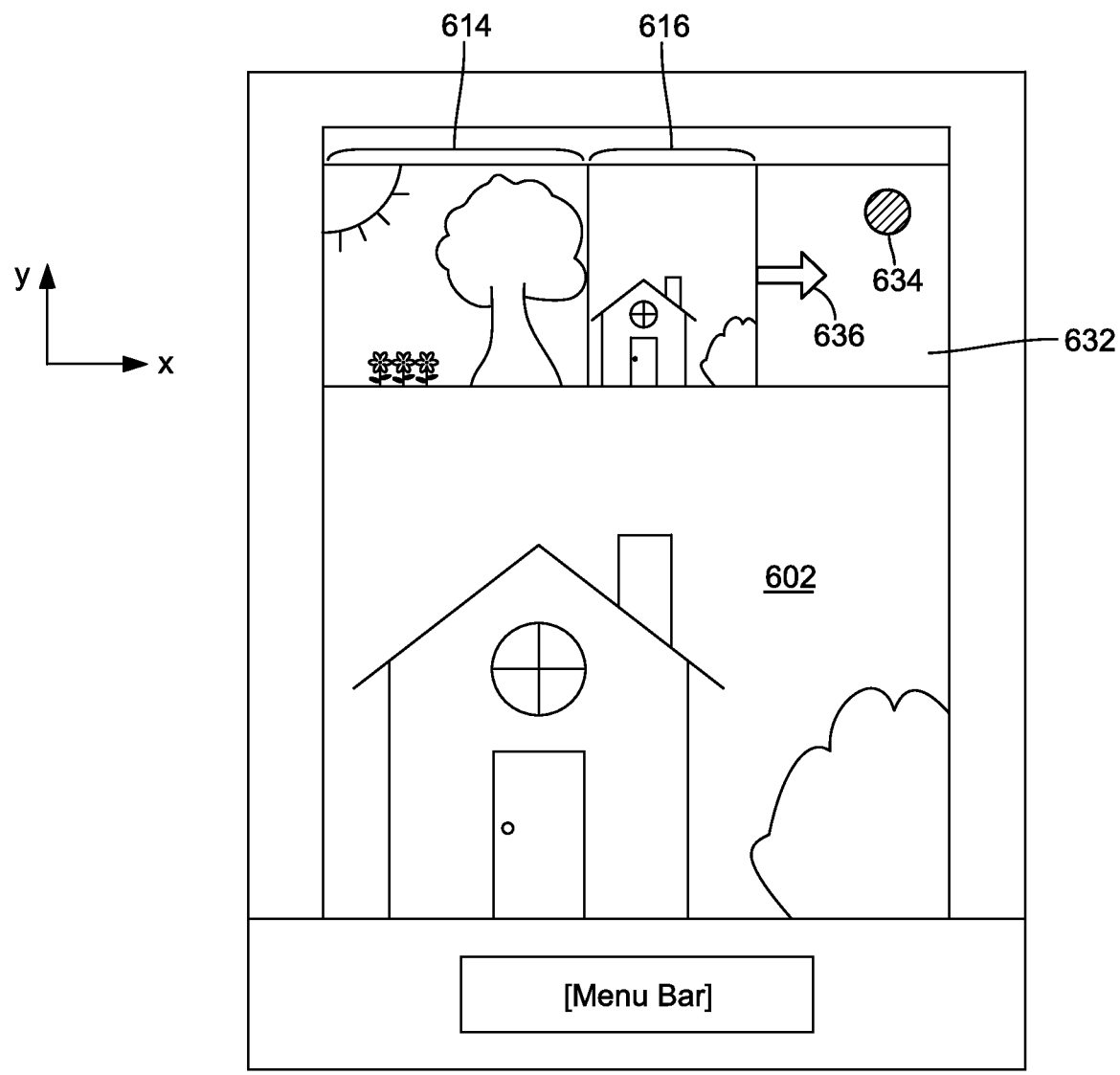
Figure 6E:
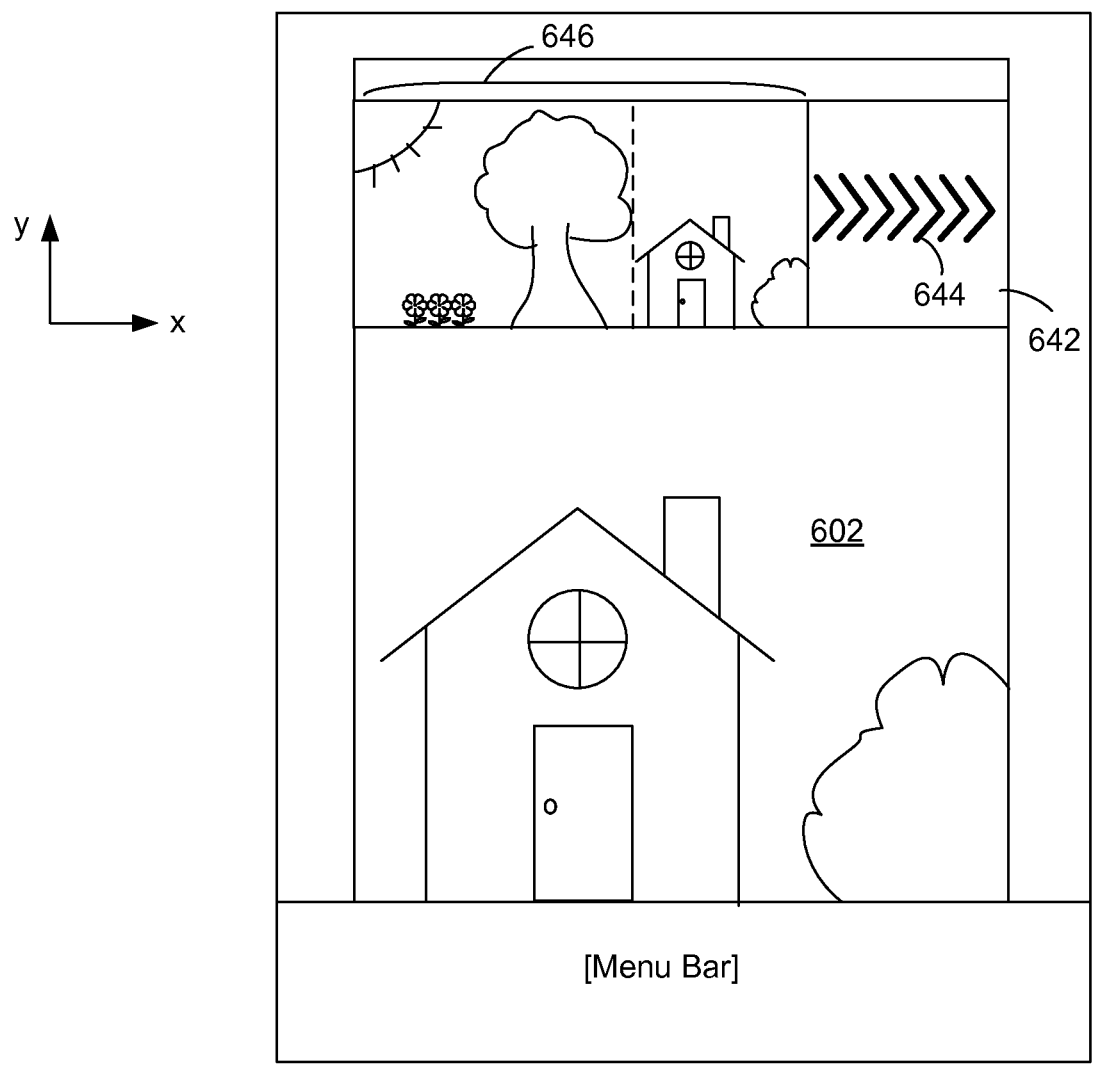
Figure 6F:
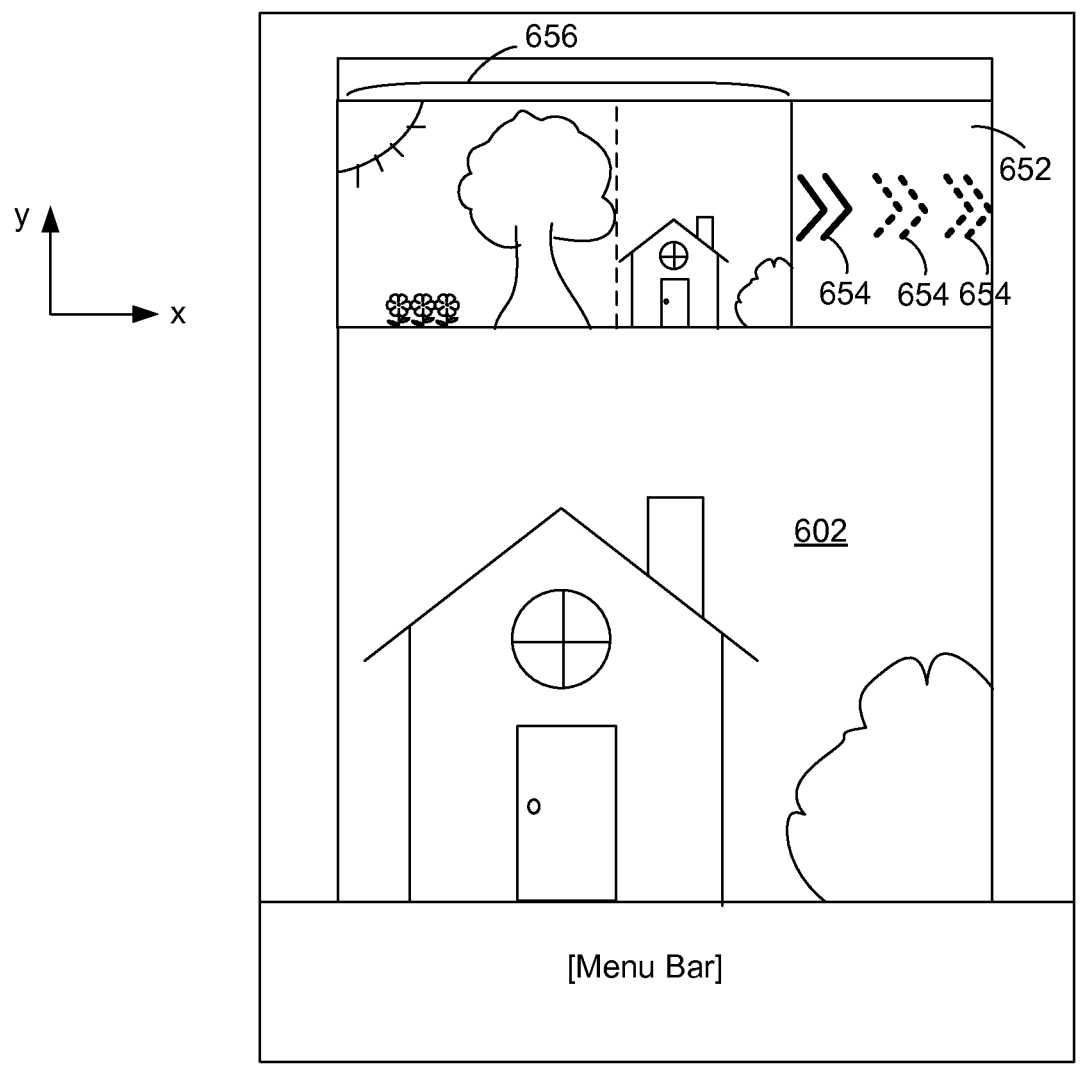
Figure 6G:
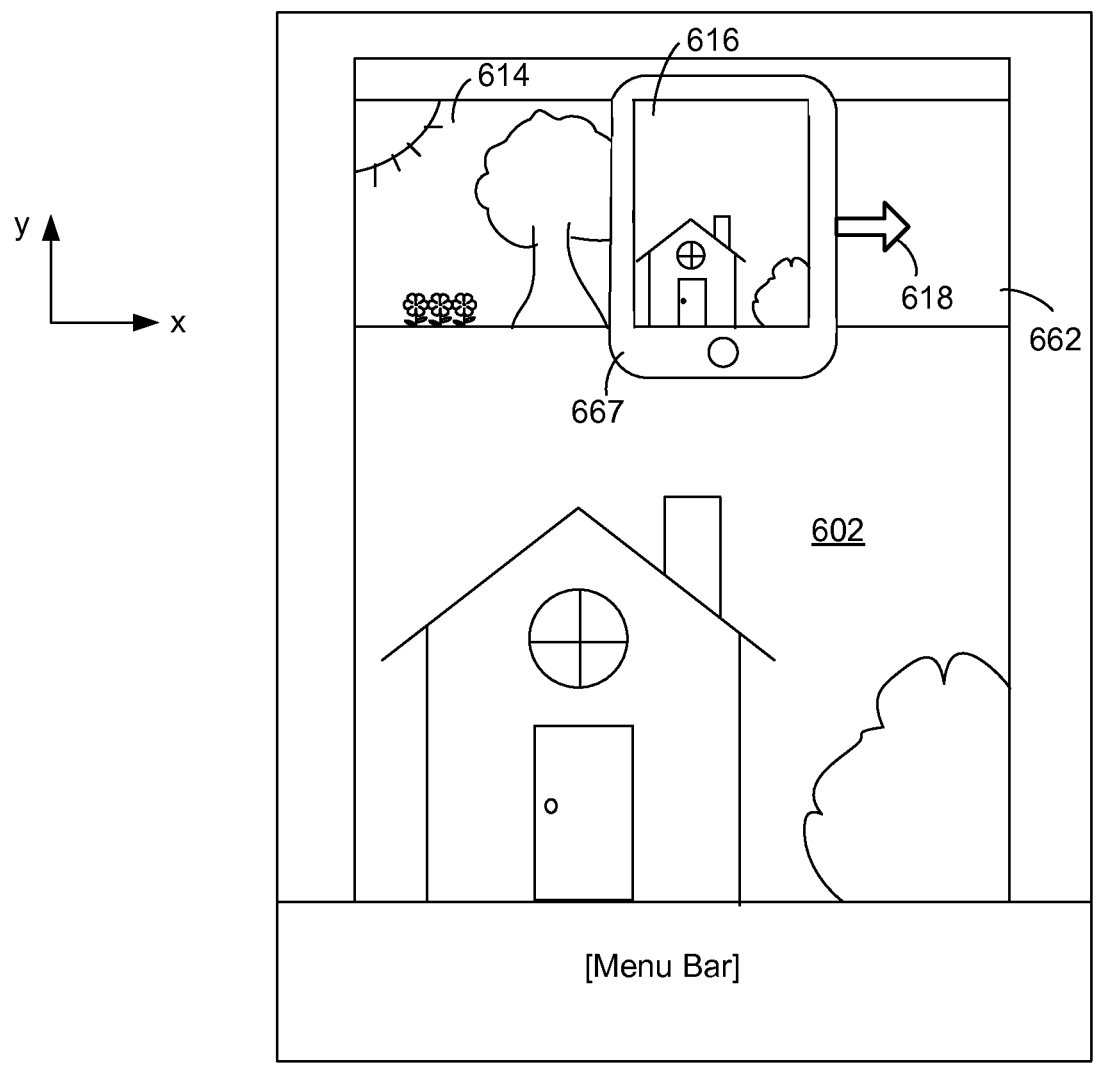
Figure 6H:
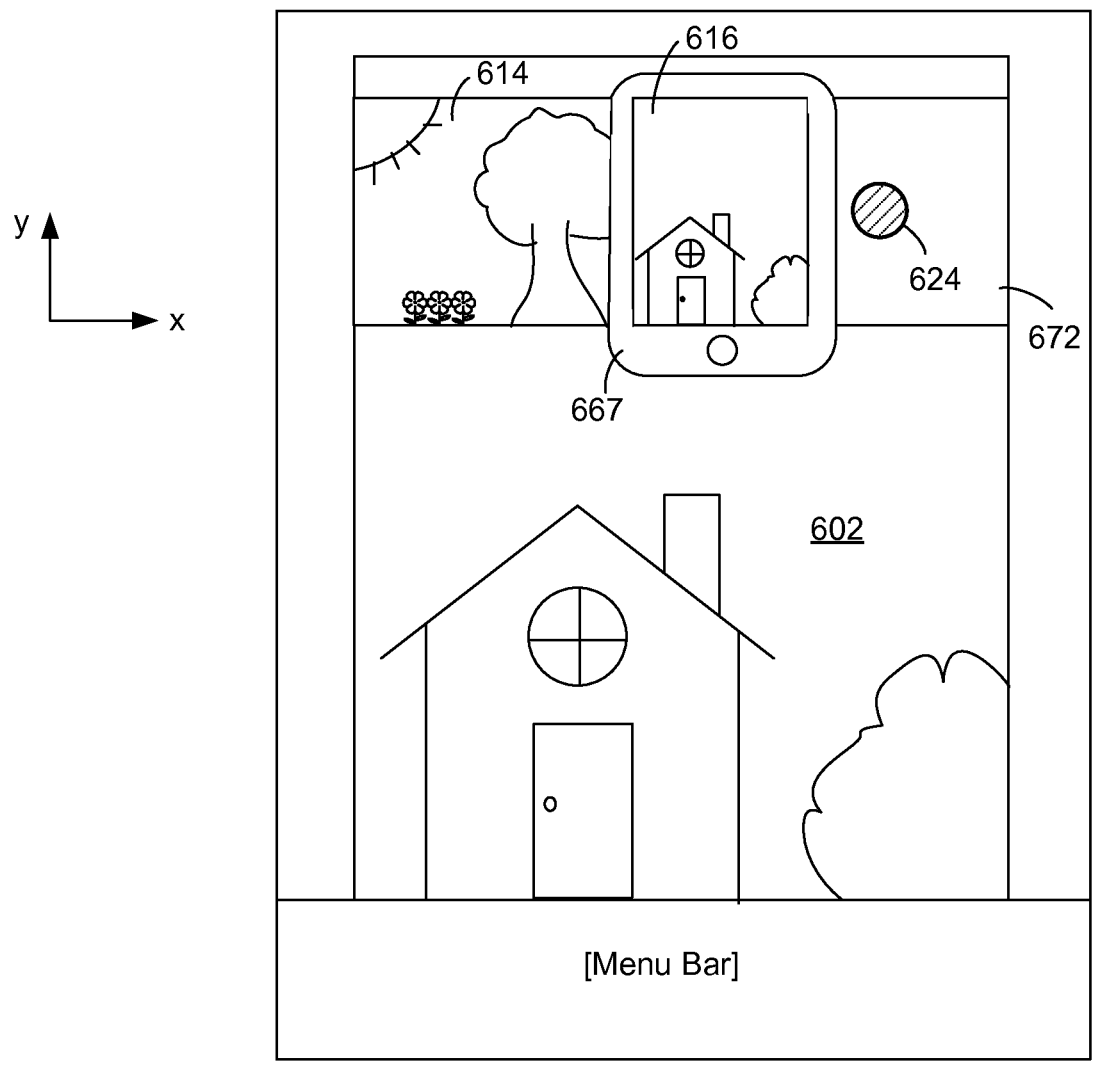
Figure 6I:
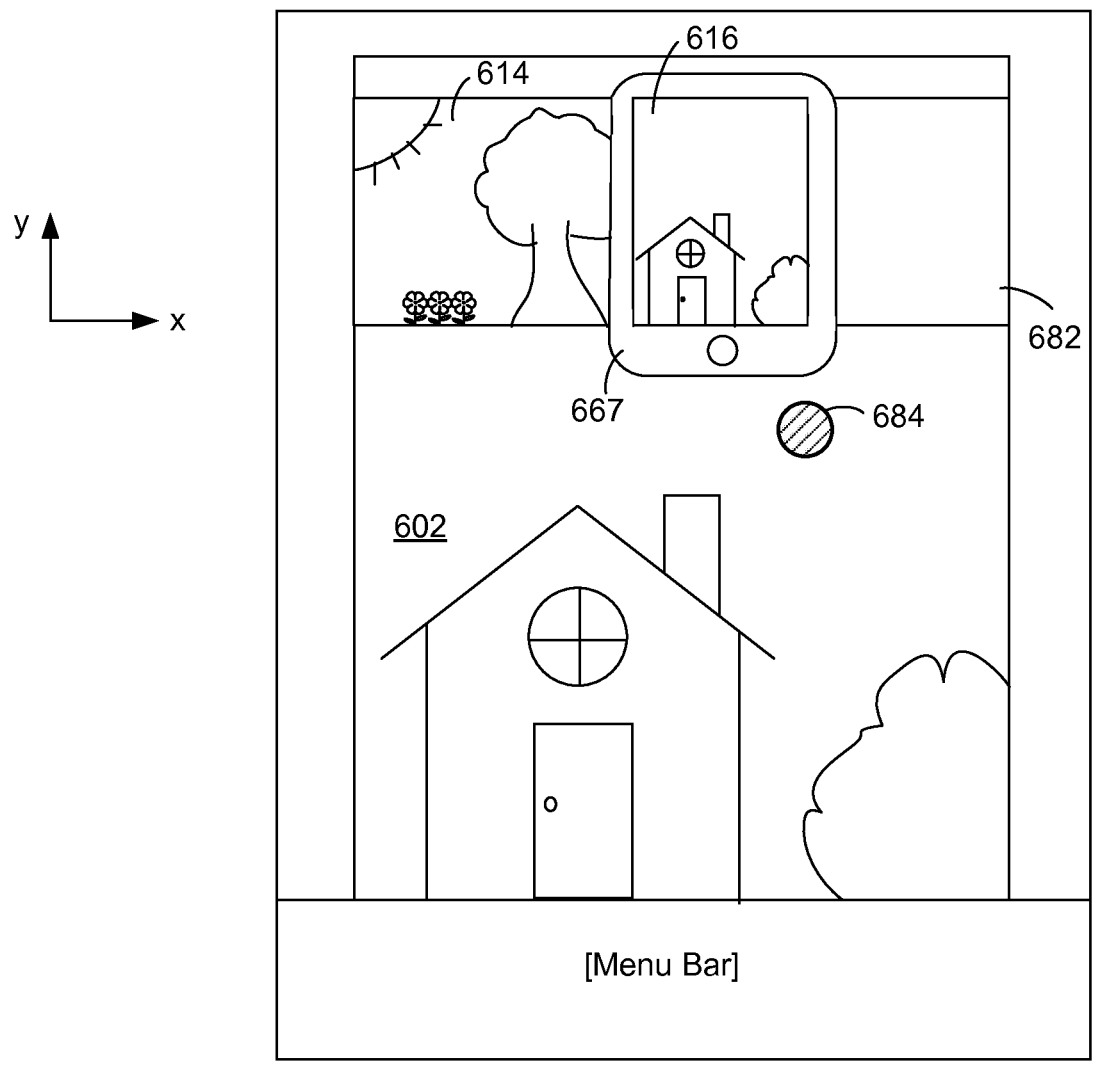
Figure 6J:
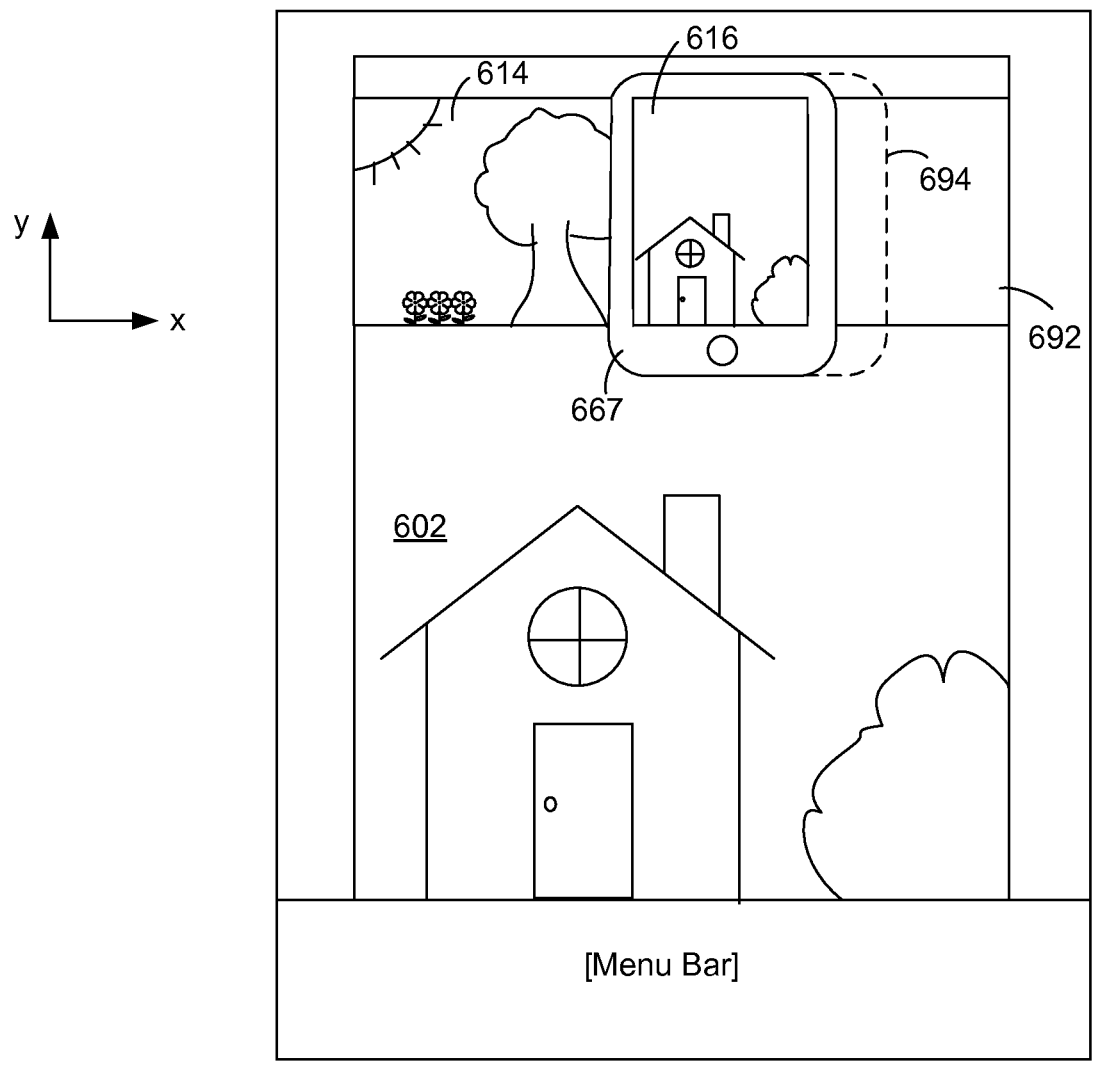
Figure 6K:
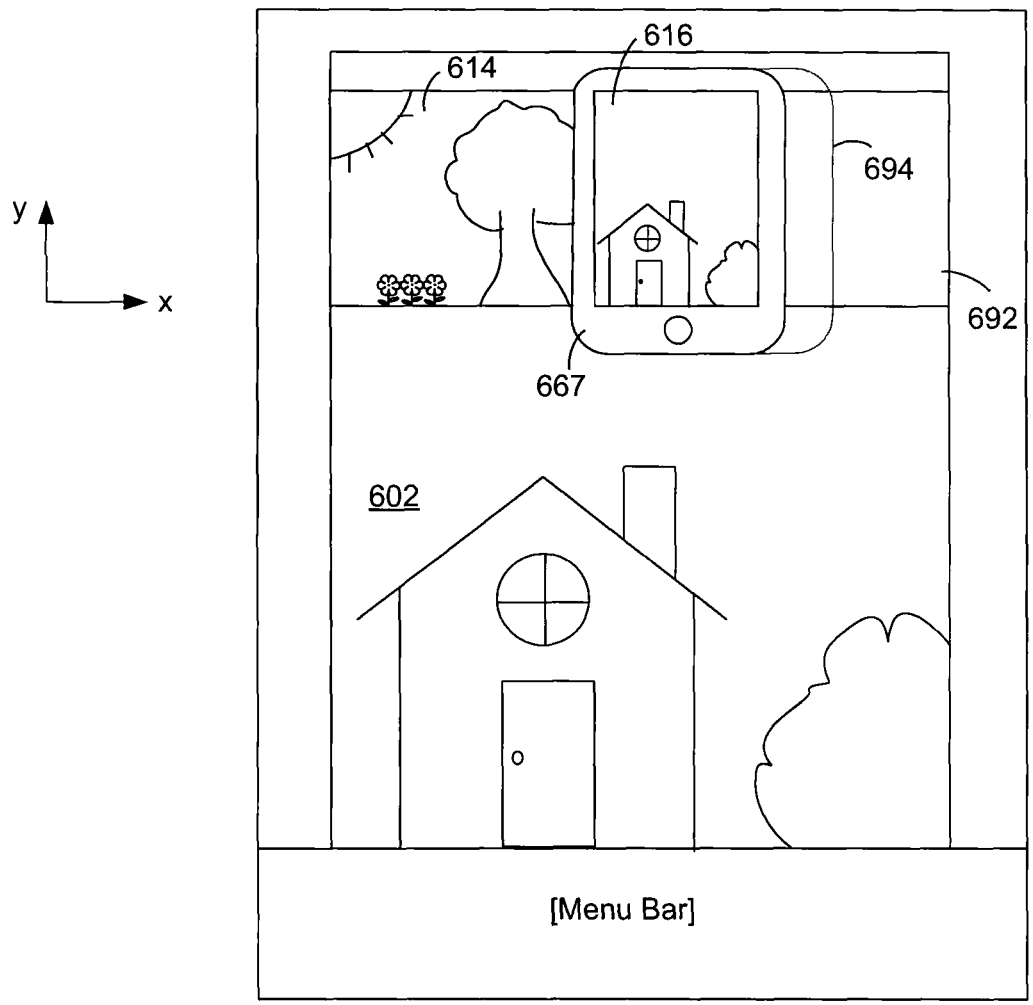
Figure 6L:
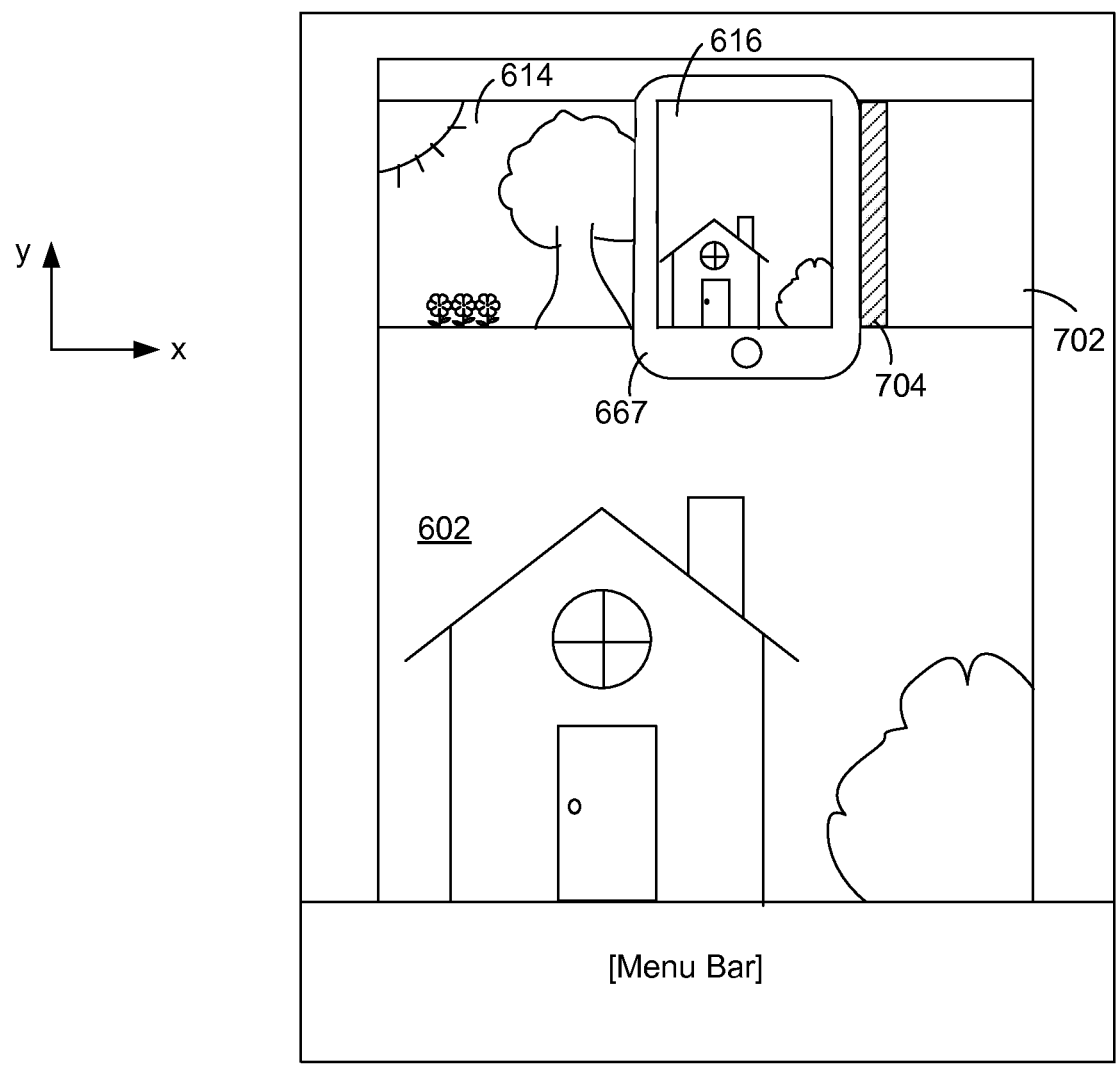
Figure 6M:
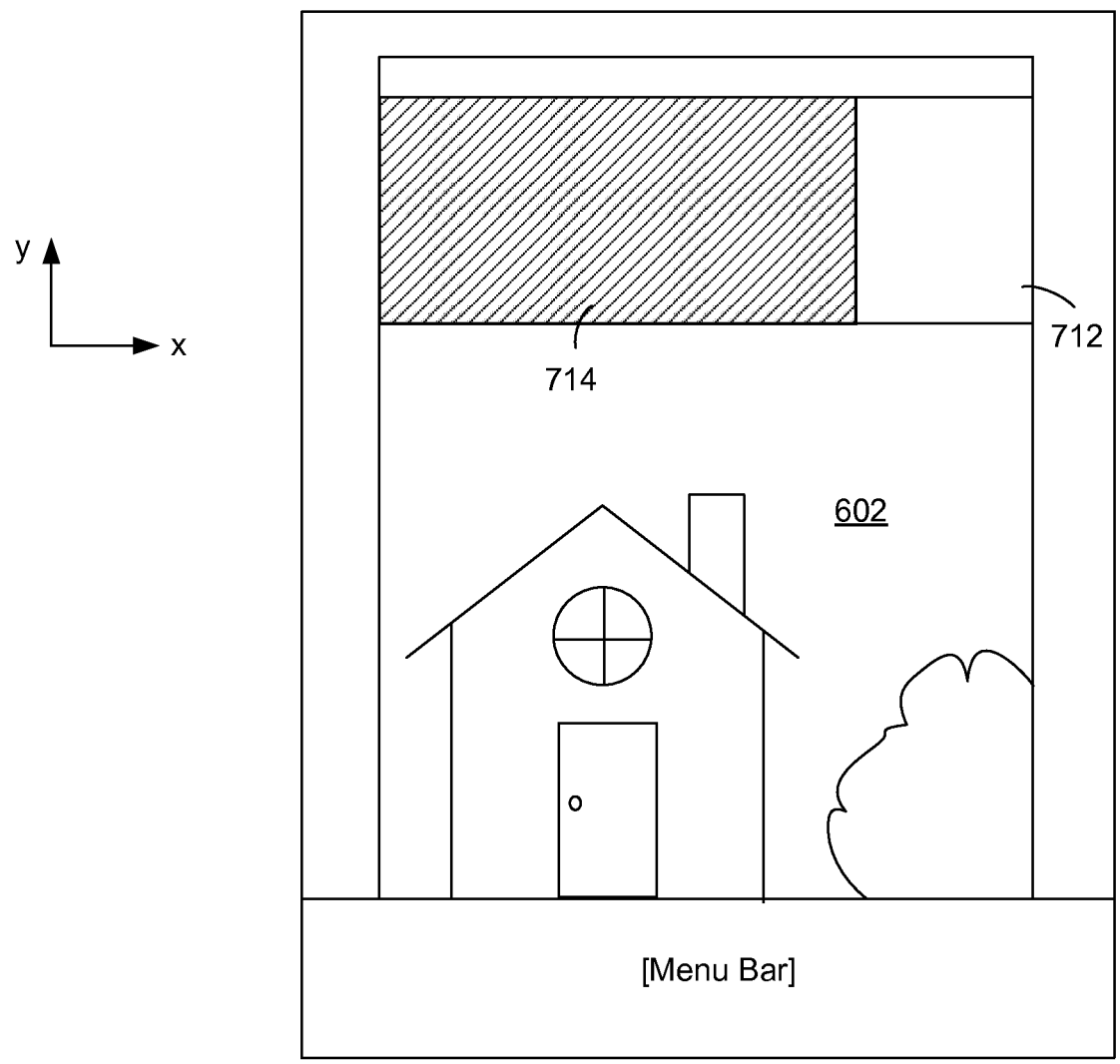
Figure 6N:
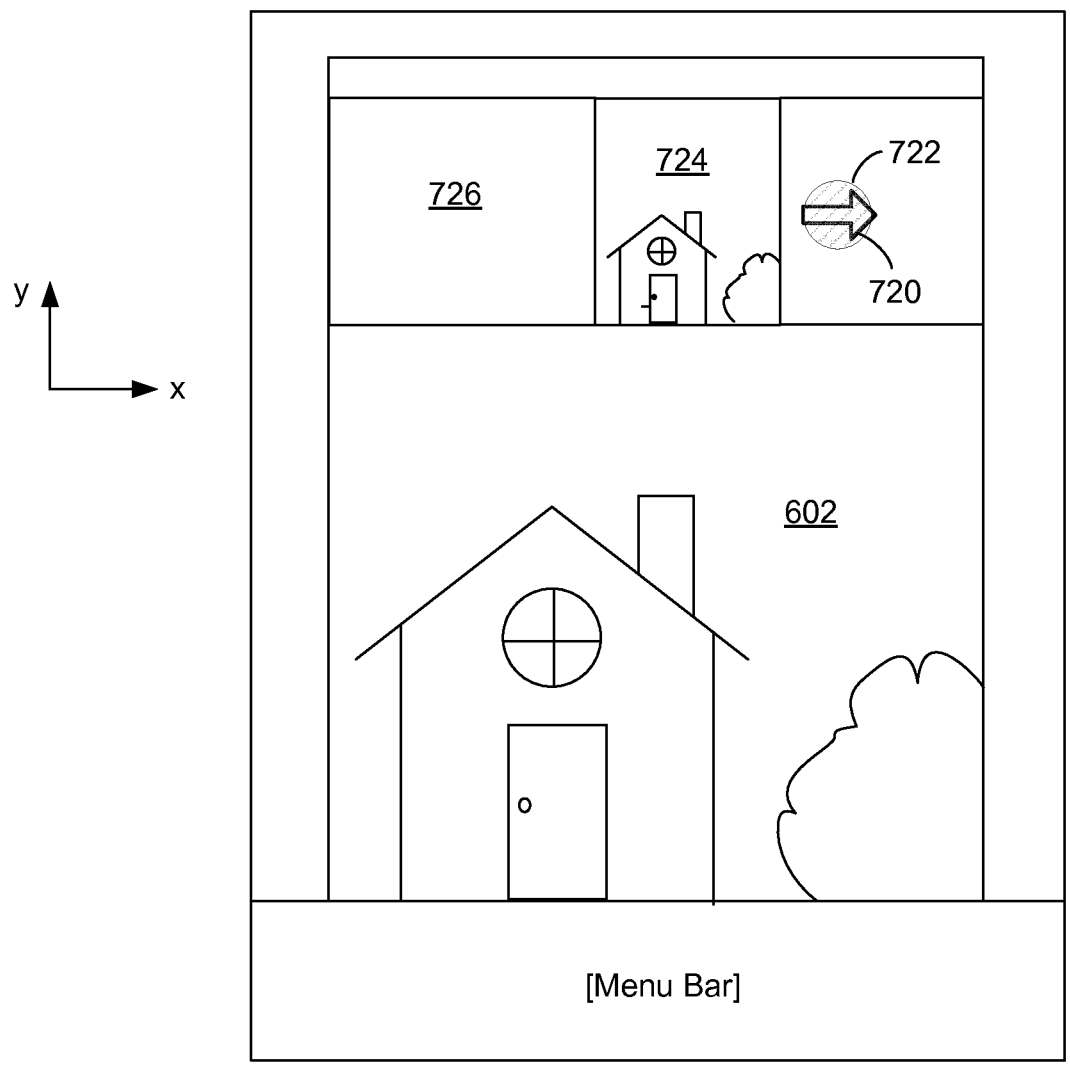
Figure 6O:
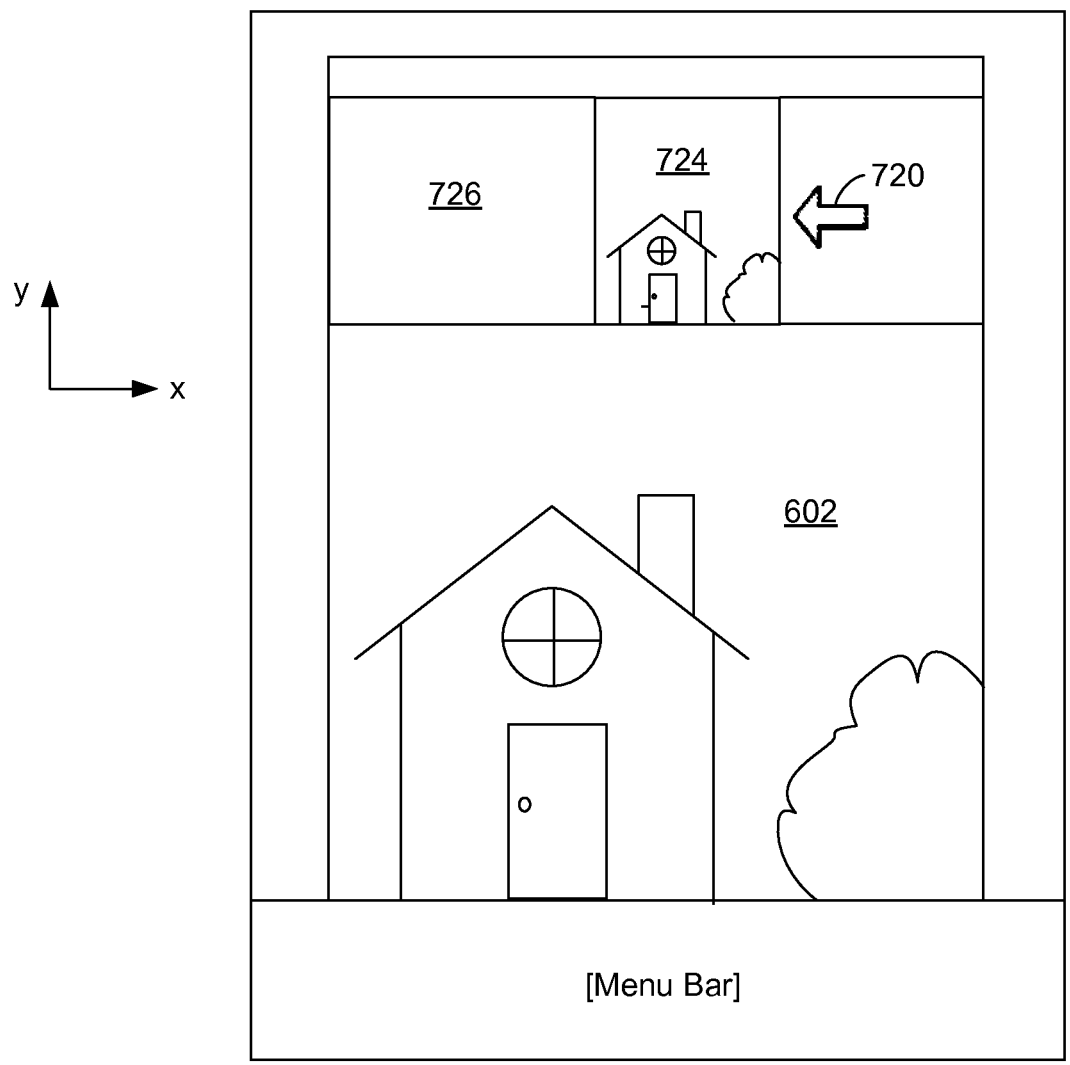
Figure 6P:
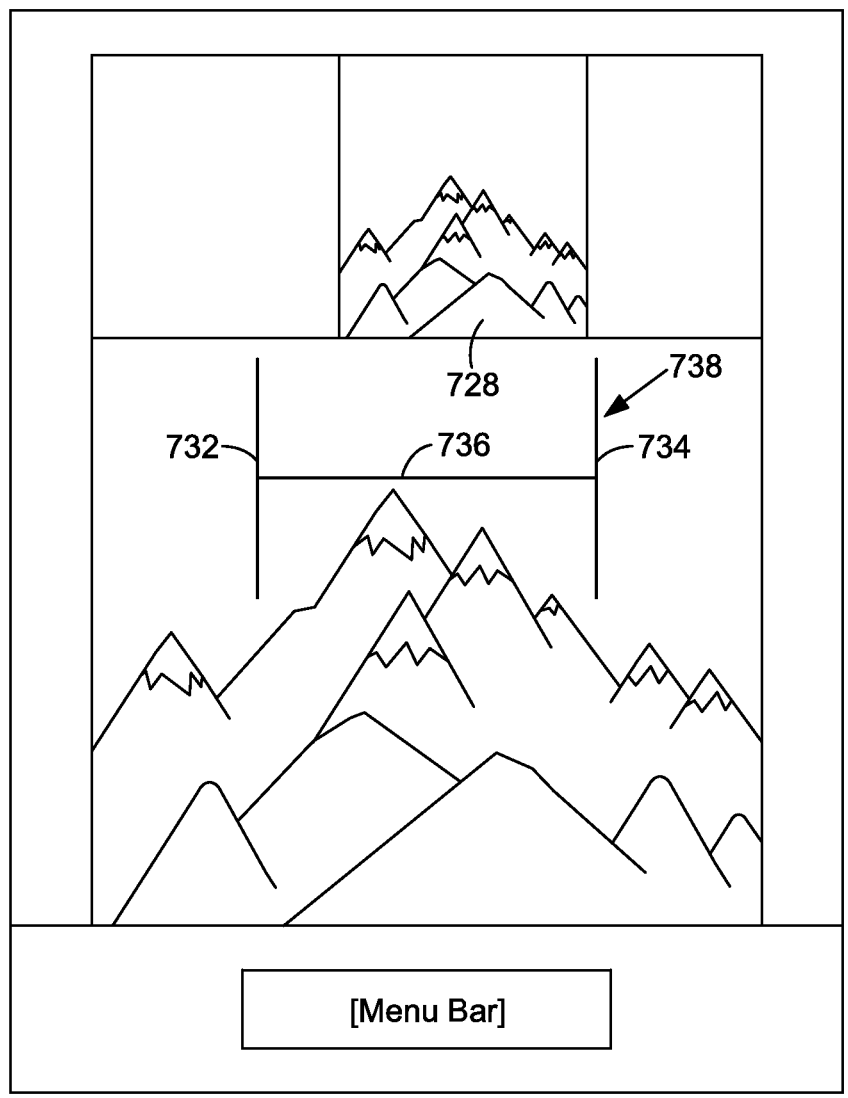
Figure 6Q:
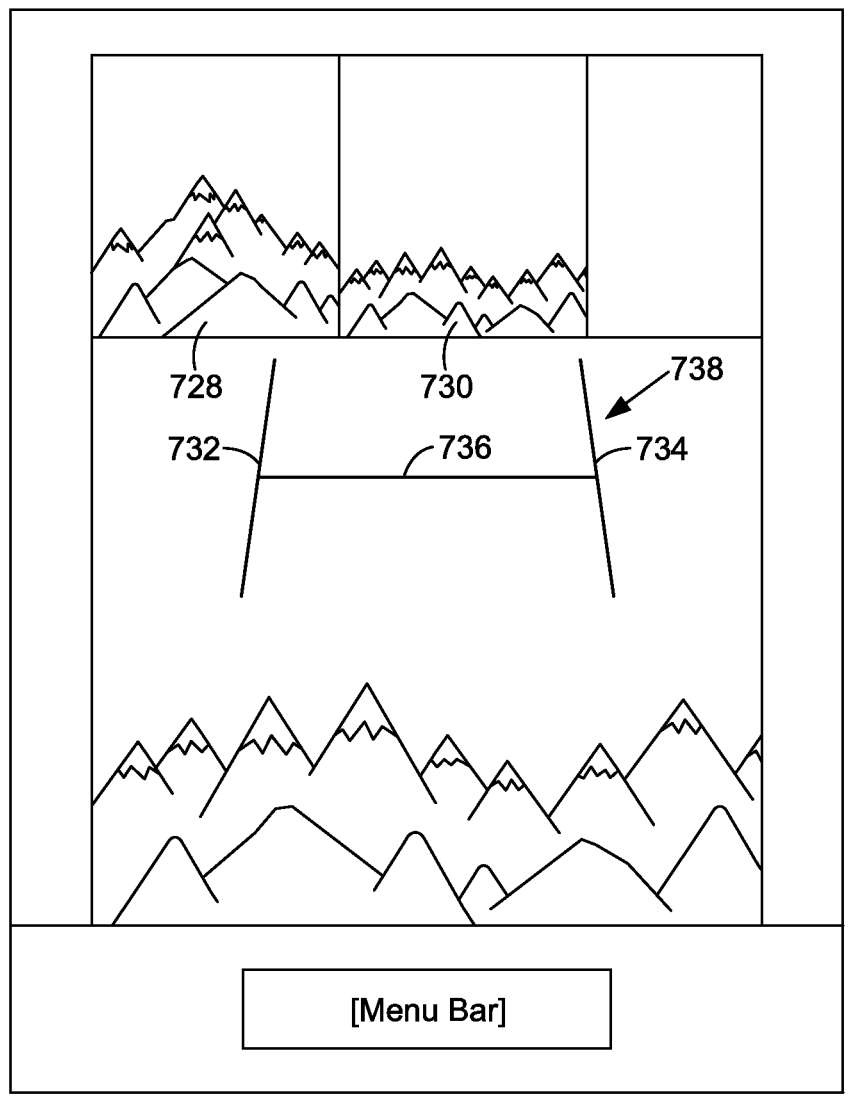
Figure 6R:
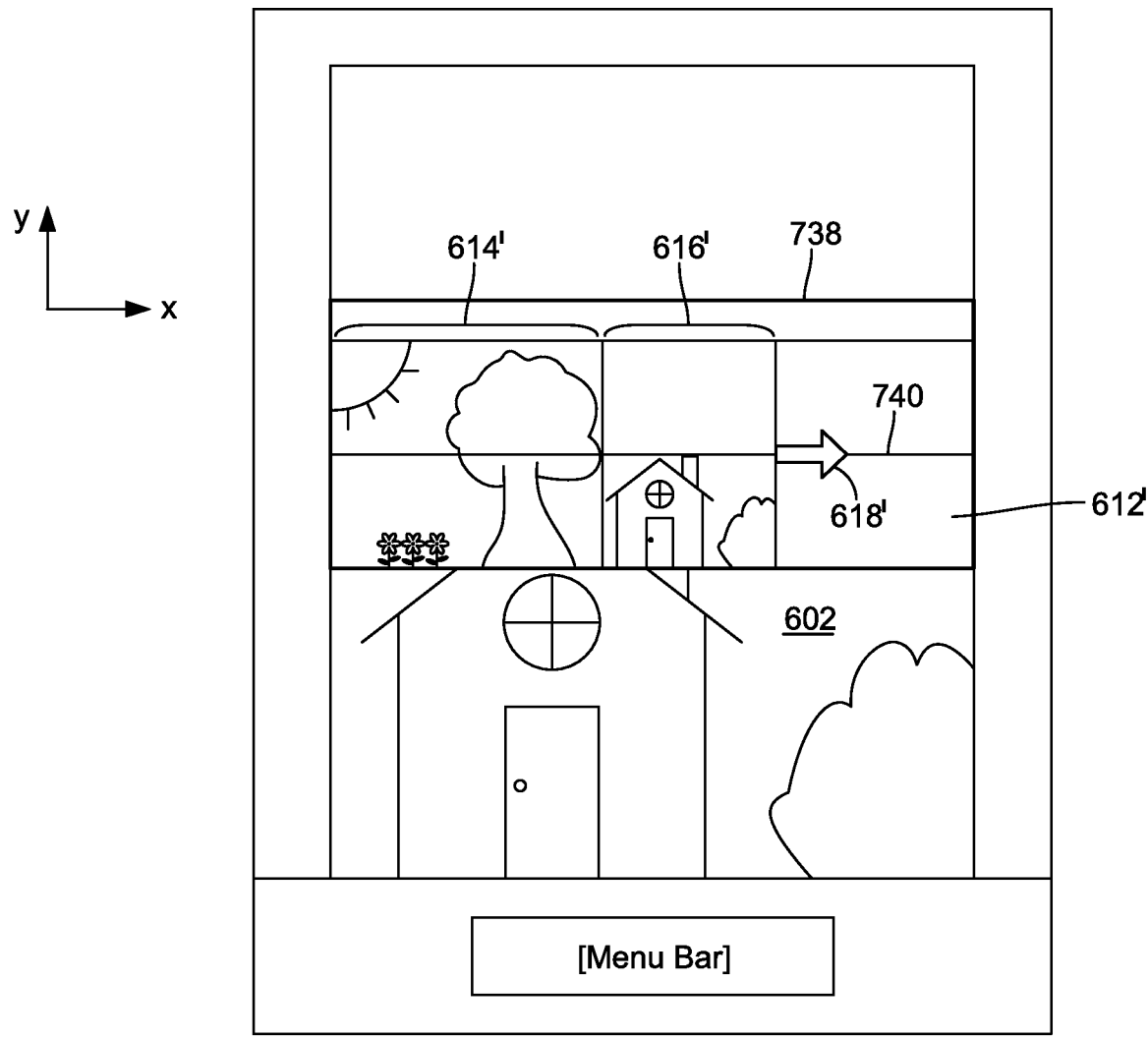
Figure 6S:
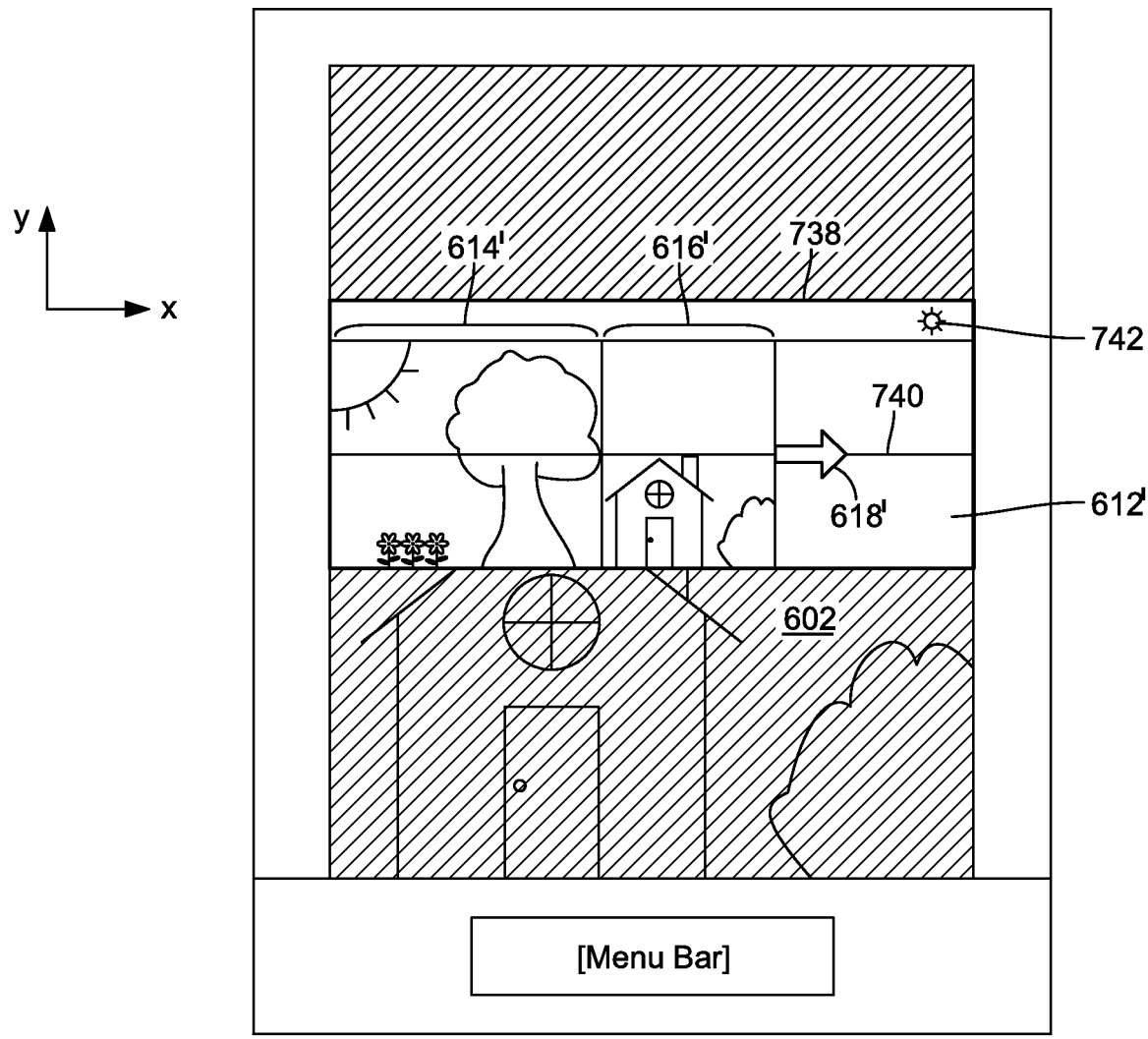
Figure 6T:
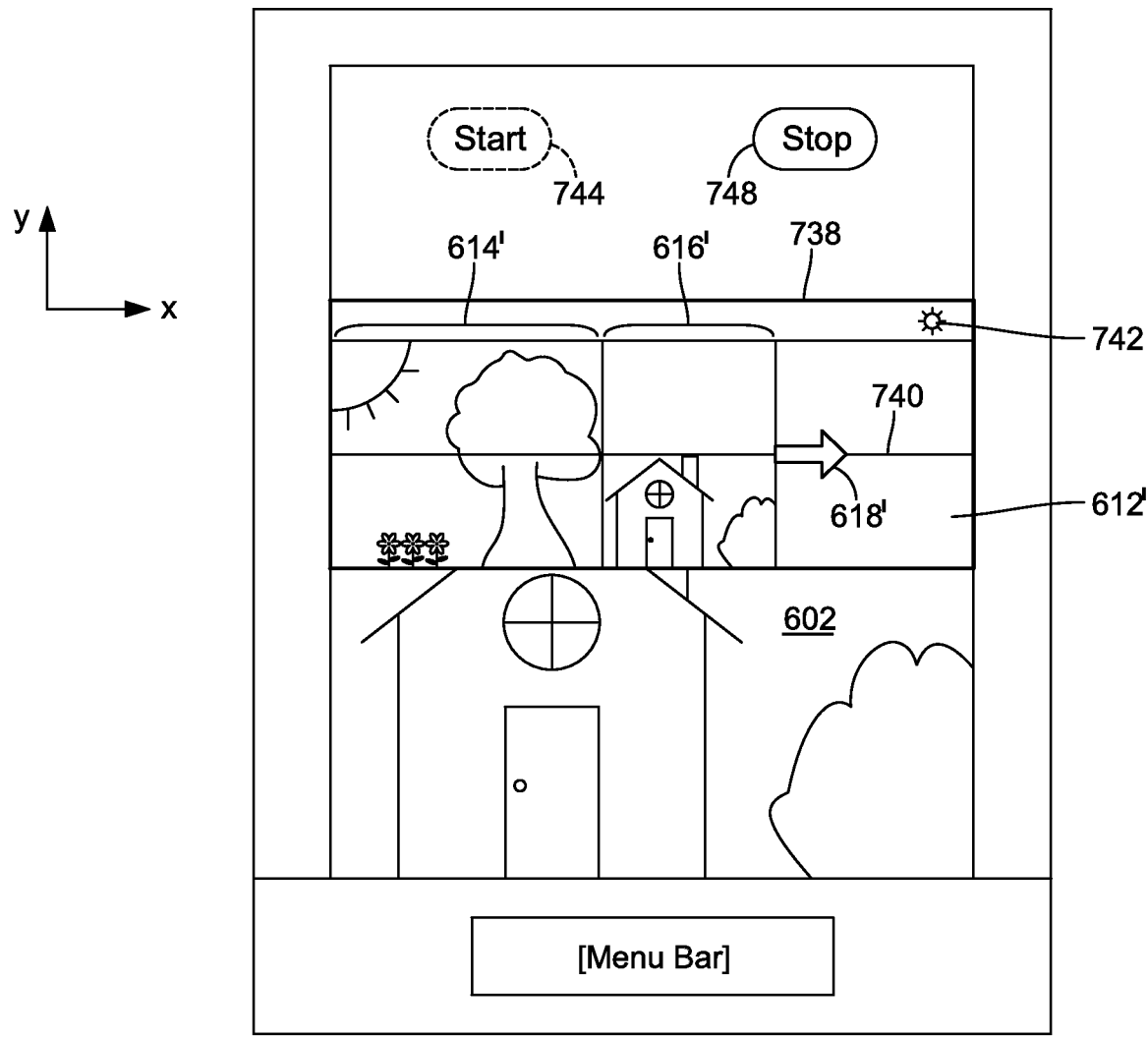

FIGS. 6B-6T illustrate examples of UI screens depicting the provisional image 602 and non-textual indicators, including in many cases, non-textual indicators representative of a safe or preferred scanning speed, displayed on the portable device 200. FIG. 6B depicts an example screen 610 showing the provisional image 602 and a scan speed indicator region 612. The scan speed indicator region 612 is shown as an overlay over a top part of the provisional image 602. In this example, the scan speed indicator region 612 (also referred to as a scan speed indicator bar) includes a previous capture image portion 614, a current capture image portion 616, and a scan speed indicator 618. The scan speed indicator region 612 conveys more than one type of information. The previous capture image portion 614 and the current capture image portion 616 together include a preliminary image of the panoramic image captured to that point. In many embodiments, the current capture image portion 616 will have the same content as the provisional image 602. In some embodiments, the image portions 614 and 616 are displayed in proper scale to indicate the amount of progress in capturing the panoramic image. In some embodiments, the UI will be configured such that a captured image extending across the entire width of the screen (as occupied by previous image capture portion 614, current image capture portion 616, and scan speed indicator region 612) will have reached a predetermined limit for capturing the horizontal dimension of the panoramic image. Alternatively, the previous capture image portion 614 and a current capture image portion 616 may be replaced with a color bar indicating the progress toward completion of the panoramic image capture; or such a colored bar can be depicted alongside or superimposed over those image portions and/or scan speed indicator region 612.

In one embodiment, the scan speed indicator 618 includes an arrow image that changes size if the maximum scanning speed (such as the scan speed calculated in block 418) is different from the current scan speed. Of course, as will be apparent from the various embodiments described herein, speeds other than a maximum scanning speed may be used as the reference. The reference may be to any reference speed that the system either determines or recognizes as an appropriate scanning speed. The change in size of scan speed indicator 618 can be proportional to the suggested amount of change relative to the current scan speed. The arrow size increases, for example, when it is determined in block 418 that the user can scan faster (e.g., a "go faster" indicator). Conversely the arrow size decreases when it is determined in block 418 that the user should scan or pan slower (e.g., a "go slower" indicator). The arrow image points in a rightward directionality, in the same direction as the scan direction. It is contemplated that the arrow image points in a leftward directionality if the scan direction is from right to left. Analogous conventions will be used if the scan direction is either up or down.

In another embodiment, the scan speed indicator 618 includes an arrow image in a specific color depending on the scan speed calculated in block 418. The arrow image color can be a traffic light color such as yellow, green, or red. A yellow colored arrow image can be provided, for instance, to caution the user that he/she is approaching the maximum scan speed (again, such as that calculated in block 418). Conversely, a green colored arrow image can be provided when the current scan speed is well below the calculated scan speed. Of course, a red symbol (such as a square, octagon, etc.) can be used to instruct the user to stop scanning.

In an alternative embodiment, the scan speed indicator 618 includes an arrow image that blinks or is otherwise animated in accordance with the scan speed calculated in block 418. Additionally, non-visual signals, such as the above described audible or haptic signals might be used to signal a user to alter the scanning speed. In addition to using intensity of a tone to indicate transition toward a problematic scanning speed, haptic feedback, such as a pulse or vibration of increasing intensity as the user approaches the maximum scanning speed might be utilized to guide the user.

FIG. 6C illustrates an alternative scan speed indicator region 622 to the scan speed indicator region 612 of FIG. 6B. The scan speed indicator region 622 differs from the scan speed indicator region 612 by including a scan speed indicator 624 instead of the scan speed indicator 618. The scan speed indicator 624 includes an image other than an arrow, such as a circle or traffic light symbol. The scan speed indicator 624 is specifically colored depending on the scan speed as calculated in block 418, as discussed above. The scan speed indicator 624 can be depicted in traffic light colors such as yellow, green, or red.

FIG. 6D illustrates a scan speed indicator region 632 including a scan speed indicator 634 and a scan direction indicator 636. The scan speed indicator 634 includes an image other than an arrow, such as a circle or traffic light symbol. The scan speed indicator 634 is variably colored depending on the scan speed calculated in block 418, as discussed above. The scan speed indicator 634 can be depicted in traffic light colors such as yellow, green, or red. The scan direction indicator 636 includes an image indicating the direction in which the user should scan or pan the portable device 200 (e.g., an arrow pointing to the right).

FIG. 6E illustrates a scan speed indicator region 642 including a scan speed indicator 644 and a panoramic image indicator 646. The scan speed indicator 644 includes a plurality of arrows, chevrons, or other images denoting a rightward directionality and which are animated to denote the scan speed determined in block 418. Example animations can be of many conceivable forms, including as just some examples: causing the plurality of arrows, chevrons, or other images denoting a rightward directionality to blink in accordance with the determined scan speed; causing the arrows, chevrons, or other images to change color in accordance with the determined scan speed or to change size in accordance with the determined scan speed; highlighting successive portions of the plurality of arrows, chevrons, or other images denoting a rightward directionality to simulate movement from left to right in accordance with the determined scan speed; etc. Note that the plurality of arrows, chevrons, or other images denoting a rightward directionality may instead denote a leftward directionality if the panoramic image is being captured by scanning from right to left. The panoramic image indicator 646 may include the previous capture image portion 614 and current capture image portion 616 discussed above for FIG. 6B, or a color bar indicating the progress toward completion of the panoramic image capture.

FIG. 6F illustrates a scan speed indicator region 652 including a scan speed indicator 654 and a panoramic image indicator 656. The scan speed indicator 654 includes a plurality of arrows, chevron, or other images denoting a rightward directionality and which are animated to identify a scan speed. The identified scan speed can be selected from a plurality of options, and the display of the speed can similarly be one of multiple options. For example, the identified scan speed can be the detected scan speed of the camera device as detected at block 406 in FIG. 4; or it can be a previously determined recommended scan speed; or it can be a safe scan speed, as determined at block 418 of FIG. 4. Accordingly, many display options are possible for the scan speed indicator for each possible type of the speeds to be displayed. For example, in one embodiment, where scanning is from left to right, the plurality of arrows, chevrons, or other images denoting a rightward directionality are displayed at different locations as a function of time in a left to right direction, indicating motion in the identified direction. As one example, when the plurality of arrows, chevrons, or other images denoting a rightward directionality reaches the rightmost position, the display pattern repeats from left to right (or it may begin repeating sooner, depending on the number of elements displayed). As another example of an appropriate animation, when the identified scan speed is either a previously recommended speed or a determined safe speed, the animation can be configured to cause the animated images to "move" at an established rate when the movement of the camera device is within an acceptable range (which may be determined around or below the previously determined recommended speed or a determined safe speed), but to either move more slowly, or even to start moving backwards, when the speed is approaching or outside of the range, to suggest to a user the need to slow the movement of the camera device. As just one alternative, the animated images (whether arrows, chevrons, etc.) might remain stationary while the camera device is being moved within the acceptable range, but move in either a forward or reverse direction to suggest the need to either speed up or slow down, respectively, the rate of movement of the camera device. Similar animations may be used to suggest an appropriate movement of the camera device when the safe speed is determined by the system in response to real-time conditions. As one example, the faster the determined scan speed, the faster the plurality of arrows, chevrons, or other images denoting a rightward directionality might travel from left to right. Alternatively, if the scan speed approaches a maximum safe scan speed (which may change during the scanning operation), the arrows or chevrons might start to move backwards (though still pointing to the right), to indicate the need to slow the scanning speed. As discussed above, if the scan direction is from right to left, then the plurality of arrows, chevrons, or other images will denote a leftward directionality and its display pattern will also be from right to left; and analogously for vertical scanning in either direction. The panoramic image indicator 656 may include the previous capture image portion 614 and current capture image portion 616 as discussed above for FIG. 6B, or a color bar indicating the progress toward completion of the panoramic image capture.

FIG. 6G illustrates a scan speed indicator region 662 including the previous capture image portion 614, the current capture image portion 616, a portable device indicator 667, and a scan speed indicator 618. The portable device indicator 667 includes an image representative of the portable device 200 that is positioned relative to the current capture image portion 616 such that the current capture image portion 616 appears to be displayed on the "display" of the (virtual) portable device indicator 667. In other words, the panoramic image capture process is conceptually represented by the scan speed indicator region 662—the portion of the panoramic image already captured (depicted by the previous capture image portion 614), the portable device 200 capturing the next portion of the panoramic image (depicted by the portable device indicator 667 and the current capture image portion 616), and the (upcoming) direction and scan speed of the portable device 200 (depicted by the scan speed indicator 618).

As discussed above with respect to FIG. 6B, the scan speed indictor 618 can be an arrow image that changes size as a function of the scan speed calculated in block 418, an arrow image in a specific color depending on the calculated scan speed, or an arrow image that blinks or is otherwise animated in accordance with the calculated scan speed. The arrow image points in a rightward directionality, in the same direction as the scan direction. It is contemplated that the arrow image points in a leftward directionality if the scan direction is from right to left.

FIG. 6H illustrates a scan speed indicator region 672 similar to the scan speed indicator region 662 (FIG. 6G) except for the scan speed indicator 624 instead of the scan speed indicator 618. The scan speed indicator 624 is described above with respect to FIG. 6C. The scan speed indicator 624 can be located to the right, above, or below the portable device indicator 667.

FIG. 6I illustrates a scan speed indicator region 682 similar to the scan speed indicator region 662 (FIG. 6G) except for the scan speed indicator 684 instead of the scan speed indicator 618. The scan speed indicator 684 can be located to the right, above, or below the portable device indicator 667. The scan speed indicator 684 includes a dot or other image that moves to the right in accordance with the maximum scan speed (again, for example, as calculated in block 418). The scan speed indicator 684 is configured to be a moving image that the user "plays" catching up to with the portable device indicator 667 (which represents the portable device scanning in real-time to capture the panoramic image). For example, the scan speed indicator 684 may be a moving dot analogous to those commonly shown in karaoke song lyrics screens. The scan speed indicator therefore sets a pace that the user matches by moving the device such that the portable device indicator keeps pace with scan speed indictor 684. Thus, the scan speed indicator region 682 is configured to provide a gaming-like environment that presents preferred scan speed and a fun interface for the user to respond in response to the presented scan speed.

FIGS. 6J-6K illustrate a scan speed indicator region 692 similar to the scan speed indicator region 682 (FIG. 6I) except for a scan speed indicator 694 instead of the scan speed indicator 684. The scan speed indicator 694 includes another image representative of the portable device 200 that is located to the right of the portable device indicator 667. The scan speed indicator 694 is rendered as a translucent, less distinct, or other image rendering distinguishable from the portable device indicator 667. For example, FIG. 6J shows the scan speed indicator 694 rendered in dotted lines. As another example, FIG. 6K shows the scan speed indicator 694 rendered as a ghost image. The scan speed indicator 694 is configured to move to the right in accordance with the scan speed calculated in block 418. Similar to the gaming aspect discussed above for FIG. 6I, the scan speed indicator 694 is displayed for the user to attempt catching up to with the portable device indicator 667. As the user catches up (or not), the relative positions of the portable device indicator 667 and scan speed indicator 694 to each other are updated on the portable device 200.

FIG. 6L illustrates a scan speed indicator region 702 similar to the scan speed indicator region 692 (FIGS. 6J-6K) except for a scan speed indicator 704 instead of the scan speed indicator 694. The scan speed indicator 704 includes a color bar that fills in toward the right at a rate in accordance with the scan speed calculated in block 418. The scan speed indicator 704 is positioned immediately to the right of the portable device indicator 667. For example, the scan speed indicator 704 may be a green bar. As described above for FIGS. 6J-6K, the user can "play" catch up to the scan speed indicator 704 by moving the portable device 200 at a certain speed. As the user catches up (or not), the relative positions of the portable device indicator 667 and scan speed indicator 704 to each other are updated on the portable device 200.

FIG. 6M illustrates a scan speed indicator region 712 comprising a scan speed indicator 714. The scan speed indicator 714 is configured as a color bar (e.g., green) that fills in toward the right at a rate in accordance with the scan speed calculated in block 418. For example, the horizontal length of scan speed indicator 714 could be proportional to the ratio of the detected scanning speed to safe or maximum scanning speed. Alternatively, the bar used as scan speed indicator 714 may be used differently, such as to indicate the amount of progress in capturing the panoramic image; while the color of the bar is used to reflect the propriety of the scan speed.

FIGS. 6N-6O each depict a UI which includes an interactive element providing guidance for the panoramic image capture. As discussed relative to FIG. 6B, a scan speed indicator 720 provides guidance for the appropriate scanning speed, and also indicates the direction of the scan; but unlike scan speed indicator 618 of FIG. 6B, scan speed indicator 720 is an interactive element such as would be displayed on a device with a touch screen display. In response to a user touch, as indicated by the shaded region 722 over scan speed indicator 720, the arrow will reverse direction, as depicted in FIG. 6O. In the depicted embodiment, scan speed indicator 720 remains essentially the same location, but reverses direction in response to the touch input. As an alternative, in response to the touch input, scan speed indicator 720 could move to the opposite side 726 of the initial frame 724 so that the indicator 720 would "lead" the scan, and therefore would not need to be superimposed over one or more of the image portions captured to form the panoramic image.

FIGS. 6P-6Q each depict an alternative UI configured to provide feedback to a user if the user should happen to tilt the camera device away from the plane in which the device was oriented when the panoramic capture scan was initiated. For example, FIG. 6P depicts an initial image portion 728. Although other alternatives are possible, it is reasonable to assume that when a user begins the scanning operation the camera is correctly oriented to capture the intended subject matter. However, as the user begins the movement which will scan the camera device, there is a risk that the orientation may change. As depicted in FIG. 6Q, as can be seen from a comparison of initial image portion 728, and following image portion 730, the latter image portion is non-contiguous with initial image portion 728; and as can be visually detected by comparison of the two image portions there is a far greater dimension of open space at the top of the image, indicating that the camera has been tilted away from the initial plane, with the top of the camera moving away from the subject matter, thereby moving the picture lower within the viewfinder. Accordingly, vertical tilt indicator 738 is displayed, which in this example includes a pair of largely vertically-extending, guidance crossbars 732, 734 connected by a horizontal connector 736. Because of the described tilt of the camera, the tops of the crossbars converge in a representation consistent with the upper portion of the camera device being moved closer to the user. In some embodiments, the crossbars will be updated in real time, and as the camera tilt is reversed toward the original position, the opposing crossbars will move toward a more parallel relationship to one another. An inclination reference of this type can be generated in response to a gyroscope or other inclination sensor in the camera device.

FIGS. 6R-6T depict configurations for a UI that at least in part represent alternative presentations to that discussed above in reference to FIG. 6B. Because of the similarity in some of the UI elements in these figures to elements in FIG. 6B, elements that are the same, but for placement, have been numbered similarly, but with prime designators (i.e., 614', 616,' etc.). As can be seen from a comparison of FIG. 6B to FIG. 6R, the previous and current image capture portions of FIG. 6B, 614 and 616, respectively, have been moved from the top of the display to a user guidance panel, in this case defined by a surrounding border 738. The user guidance panel is superimposed over a central portion of provisional image 602. Additionally, the scan speed indicator 618' is also used as part of a vertical position indicator, by the incorporation of a current scan line location indicator 740. At the beginning of any panoramic capture process, original scan line location indicator 740 will be aligned with the longitudinal axis through the center of the arrow shape of scan speed indicator 618'. To the extent that the vertical position of the portable device changes from the original position, then the original scan line indicator will be presented as offset relative to a constant position of the scan speed indicator 618'. As discussed relative to FIG. 6B, the vertical position of the portable device can include one or both of vertical distance relative to a reference and vertical orientation relative to a horizontal or vertical plane (i.e., tilt). As a result, for example, in the example of an embodiment of the portable device that is configured to determine a vertical position that includes tilt, if the top of the portable device is tilted back (away from the original orientation), during use, then the original scan line location indicator 740 will move to a position above the central longitudinal axis of scan speed indicator 618', thereby indicating to a user that the tilt needs to be reversed, such that the original scan line location indicator 740 will once again align with the central longitudinal axis of scan speed indicator 618'. As an alternative, the embodiment could be configured such that instead of scan speed indicator 618' remaining in a fixed position in the UI, and the original scan line location indicator 740 varying position in response to changes in the vertical position of the portable device, the original scan line location indicator 740 could remain in a fixed position in the UI, with the scan speed indicator 618' moving up or down in response to changes in the vertical position of the portable device.

FIG. 6S depicts a variation on the UI of FIG. 6T in which the provisional image is visible, but diminished in visibility, such as by being presented at a noticeably lower apparent brightness (or being "greyed out"), as indicated by the cross-hatching, so as to assist a user in focusing on the user guidance panel within border 738. Additionally, the UI includes an indicator region 742, here in the form of a contrasting color "light" displayed on the screen, to indicate that a panoramic image capture is taking place. As an alternative to the indicator region 742, the appearance of border 738 may be caused to change appearance, such as by changing color, when the panoramic image capture is in process.

FIG. 6T depicts a variation on the UI of FIGS. 6R and 6S, in which controls for starting and stopping the panoramic image capture process are provided in the UI. In this example, regions on the touch screen form virtual buttons to receive inputs to start and stop the process, as indicated at 744 and 748, respectively. Because the UI reflects that a panoramic image capture process is underway, the "start" button is greyed out (or could be removed from the screen entirely), as indicted by the dotted line representation. As an alternative, in some embodiments, only a single virtual button will be provided, and can be configured to display a first legend to prompt and receive a user input to start panoramic image capture; and once started, to display another legend to prompt and receive a user input to stop panoramic image capture. As with other UIs as discussed herein, sounds may be associated with the controls to start and stop panoramic image capture. For example, different "beep" sounds could be presented in association with receiving user inputs to start and stop panoramic image capture. As just one example, different beep patterns might be presented, such as one beep when image capture is started and two beeps when image capture ends.

Figure 6U:
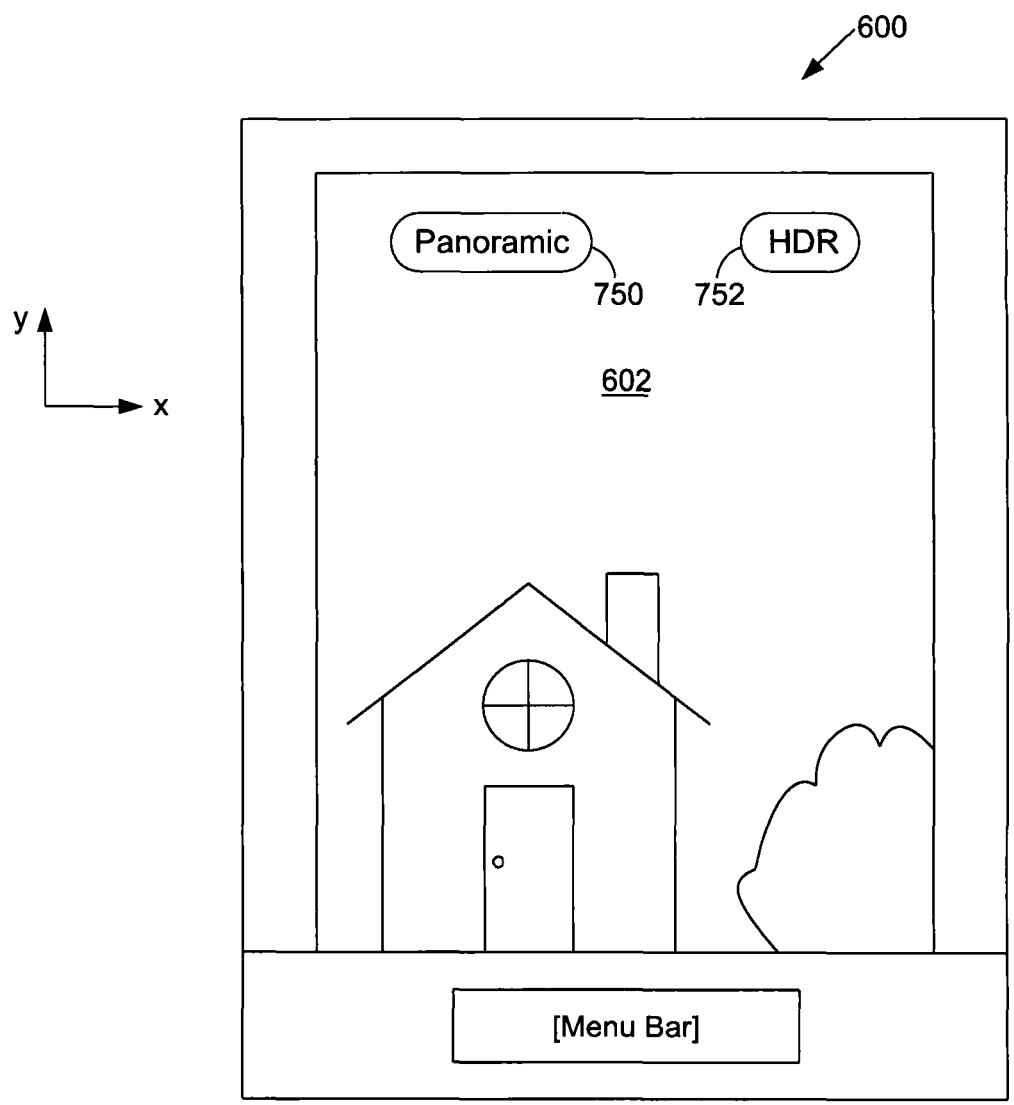

FIG. 6U depicts a UI for initiating panoramic capture mode through use of on-screen virtual buttons to select one or more image capture modes, in the depicted example to select a panoramic capture mode through virtual button 750 or to select high dynamic range image capture through virtual button 752. For example, once the panoramic capture mode is selected by a user, a UI specific to the panoramic capture process may be presented, such as, for example, a UI such as any of those depicted in any of FIGS. 6A-6T.

These and other variations for presenting the preferred scan speed are contemplated herein; and for many embodiments, once guidance has been provided to a user, the system will continue to monitor the system state(s) and will provide ongoing feedback to the user. For example, referring again to FIG. 4, once the provisional image, scan line indicators, and/or scan speed indicator are displayed on the portable device 200, blocks 404-420 repeat in real-time if the panoramic image capture is still in progress (block 422 and no branch 424). The next iteration of the blocks 404-420 includes a feedback loop to the user's response to the displayed information, such as moving the portable device 200 up or down to align with the original scan line or panning the portable device 200 faster or slower.

On the other hand, if the end of the scan path has been reached (block 422 and yes branch 426), then image data capture for the given panoramic image is completed. The end of the scan path can be implicit or explicit. For example, if the panoramic mode of operation of the portable device 200 has a maximum scan path range of 180 degrees, then the portable device 200 may automatically cease image capture once a scanning range of 180 degrees is detected. As another example, as discussed above, the user may actuate a stop panoramic image capture button or icon provided on the portable device 200, such as a button or icon (i.e., a virtual button) provided within the UI, or within a menu bar of the UI screen (e.g., bottom portion of the screen 610 of 6B).

It should be understood that the scan line indicators and the scan speed indicators may be provided either together or individually with a provisional image. In one embodiment, the provisional image and the scan line indicators may be displayed together on the portable device 200 (blocks 410 and 416), such as shown in FIG. 6A. In another embodiment, the provisional image and the scan speed indicators may be displayed together on the portable device 200 (blocks 410 and 420), such as shown in FIGS. 6B-6Q. In still another embodiment, the provisional image, scan line indicators, and scan speed indicators may all be displayed together on the portable device 200 (blocks 410, 416, and 420), as depicted in FIGS. 6R-6T. It is also contemplated that one or more of blocks 404-420 may occur more frequently than others of blocks 404-420 during a given iteration of the blocks 404-420.

In this manner, the portable device 200 is configured to provide real-time vertical and/or horizontal direction scan guidance indicators during scanning an object/scene of interest with the portable device 200 to capture a panoramic photograph of such object/scene of interest. The vertical direction scan guidance indicator includes at least a non-textual image of the original scan line, the current scan line, and an indicator for the user to horizontally reposition the portable device 200 (e.g., move the device up or down from the current position) to align the current scan line with the original scan line. The horizontal direction scan guidance indicator includes at least a scan speed indicator in accordance with a calculated scan speed (also referred to as an estimated scan speed, upcoming scan speed, or safe scan speed) at which the scan speed is fast as possible and the upcoming image processing capability of the portable device 200 will not be exceeded. Additional information may be provided during scanning such as, but not limited to, a preliminary image corresponding to the current image being captured or an image indicating the amount of progress toward completion of the panoramic image capture.

Figure 7:
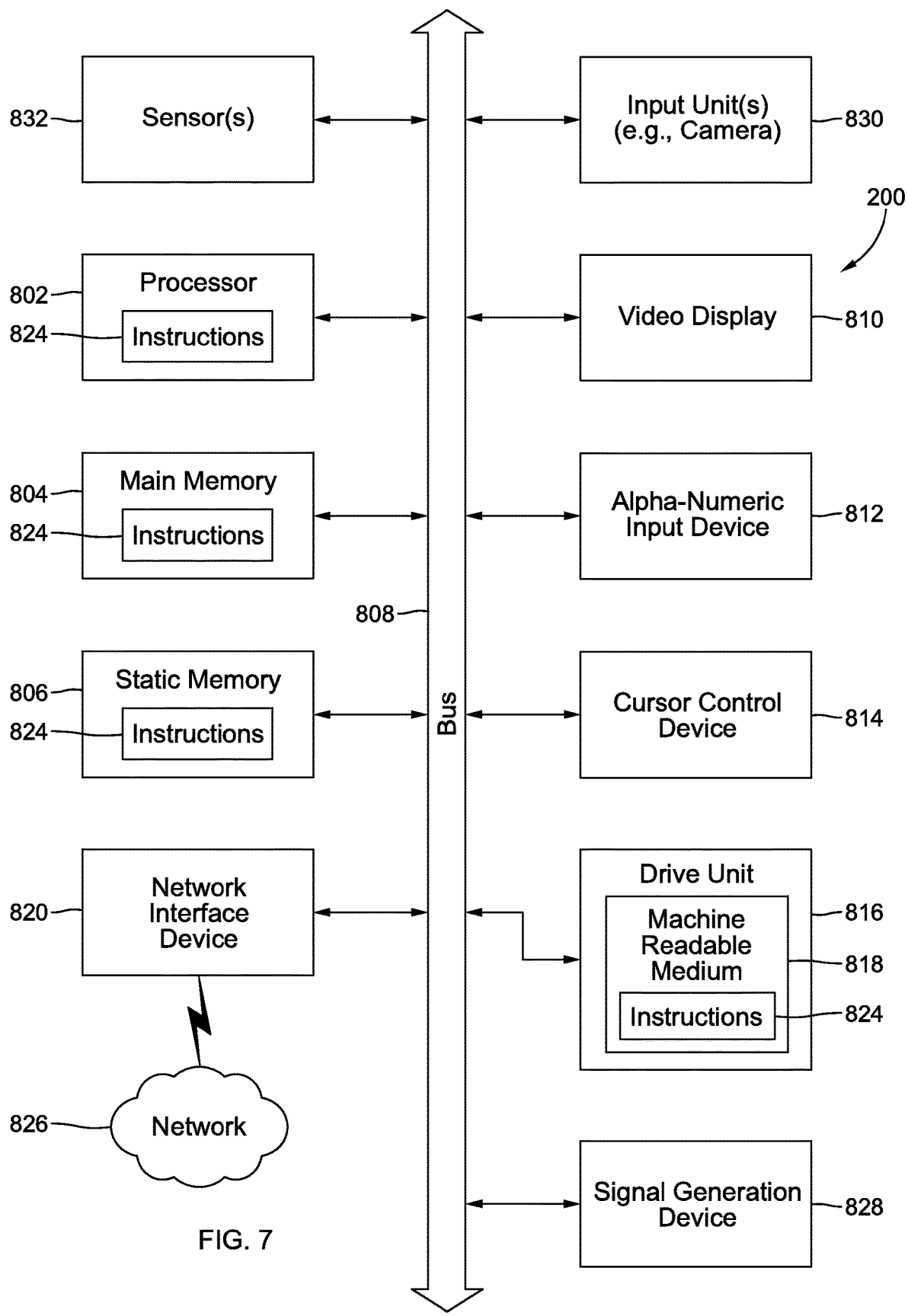
FIG. 7 depicts a block diagram representation of an example architecture for any of the portable devices of FIGS. 1A-1E according to some example embodiments.

FIG. 7 illustrates a block diagram representation of an example architecture for any of the portable devices of FIGS. 1A-1E (each within the scope of a "portable device" 200, and each also a "camera device," as described herein). Many configurations for portable device 200 will include one or more processors which will operate pursuant to one or more sets of instructions for causing the machine to perform any one or more of the methodologies discussed herein, as well as additional functionalities.

An example portable device 200 (also referred to as a "mobile device" 200) includes a processor 802 (e.g., a central processing unit (CPU), a graphics processing unit (GPU) or both), a main memory 804 and a static memory 806, which communicate with each other via a bus 808. The example portable device 200 further includes a video display unit 810 (e.g., a liquid crystal display (LCD), an organic light emitting diode (OLED) display, an infrared touch screen, or a cathode ray tube (CRT)). The video display unit 810 will, in some embodiments, include a touch sensor panel 102 (FIGS. 1A-1E). The portable device 200 also includes one or more input units 230 (e.g., a camera, image capture unit, a machine readable information reader, etc.) and sensor(s) 832 (e.g., an angular velocity sensor such as a gyroscope, an accelerometer, a global positioning system (GPS) unit, and/or other device state or motion sensors); and may include related units such as a light flash source for the camera. In many embodiments, the portable device 200 will also include an alphanumeric input device 812 (e.g., a keyboard, which may be either mechanical or virtual), a cursor control device 814 (e.g., a mouse, a track pad, a track ball, etc.), a disk drive unit 816, a signal generation device 828 (e.g., a speaker), and a network interface device 820 (e.g., a transceiver, a WiFi transceiver, a cellular transceiver, etc.).

In some embodiments, the controller assembly 104 includes the processor 802. In other embodiments, the controller assembly 104 includes the processor 802, input unit(s) 830, and sensor(s) 832. In still other embodiments, the controller assembly 104 includes the processor 802, input unit(s) 830, sensor(s) 832, main memory 804, static memory 806, and one or more other components shown in FIG. 8.

The disk drive unit 816 includes a machine-readable medium 818 on which is stored one or more sets of executable instructions 824 (e.g., apps) embodying any one or more of the methodologies or functions described herein. In place of the disk drive unit, a solid-state storage device, such as those comprising flash memory (or another form of generally non-volatile storage) may be utilized. The executable instructions 824 may also reside, completely or at least partially, within the main memory 804 and/or within the processor 802 during execution thereof by the portable device 200; the main memory 804 and the processor 802 also constituting machine-readable media. Alternatively, the instructions may be only temporarily stored on a machine-readable medium within portable device 200, and until such time may be stored externally, and received over a network 826 via the network interface device 820.

While the machine-readable medium 818 is shown in an example embodiment to be a single medium, the term "machine-readable medium" as used herein should be taken to include all forms of storage media, either as a single medium or multiple media, in all forms; e.g., a centralized or distributed database and/or associated caches and servers; one or more storage devices, such as storage drives (including e.g., magnetic and optical drives and storage mechanisms), and one or more instances of memory devices or modules (whether main memory, cache storage either internal or external to a processor, or buffers. The term "machine-readable medium" or "computer-readable medium" shall be taken to include any tangible non-transitory medium which is capable of storing or encoding a sequence of instructions for execution by the machine and that cause the machine to perform any one of the methodologies. The term "non-transitory medium" expressly includes all forms of storage drives (optical, magnetic, etc.) and all forms of memory devices (e.g., DRAM, Flash (of all storage designs), SRAM, MRAM, phase change, etc., as well as all other structures designed to store information of any type for later retrieval.

It will be appreciated that, for clarity purposes, the above description describes some embodiments with reference to different functional units or processors. However, it will be apparent that any suitable distribution of functionality between different functional units, processors, or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

As is apparent from the above description, certain systems or processes are described herein as being implemented in or through use of one or more "modules." A "module" as used herein is an apparatus configured to perform identified functionality through software, firmware, hardware, or any combination thereof. When the functionality of a module is performed in any part through software or firmware, the module includes at least one machine readable medium (as addressed earlier herein) bearing instructions that when executed by one or more processors, performs the associated functionality implemented in software or firmware. Where the description makes reference to certain functionality being performed by a "circuit" it should be clearly understood that any such functionality may alternatively be implemented, at least in part, though software or firmware. Separate "modules" implemented at least in part in program instructions may be implemented through one or more instances of machine readable media; and thus reference to such "modules" does not suggest either any separate hardware or any segregation of the instructions for the identified modules.

Considering embodiments in which modules are temporarily configured (e.g., programmed), each of the modules or components need not be configured or instantiated at any one instance in time. For example, where the modules include program instructions for implementation by a general-purpose processor, such processor may be configured as respective different modules at different times. Software may accordingly configure the processor to constitute a particular module at one instance of time and to constitute a different module at a different instance of time; or all modules may be implemented simultaneously.

Many additional modifications and variations may be made in the techniques and structures described and illustrated herein without departing from the spirit and the scope of the present invention. Accordingly, the present invention should be clearly understood to be limited only by the scope of the claims and equivalents thereof.

What is claimed is:

1. A method to facilitate obtaining a panoramic image using a portable device having a display and an image capture unit, the method comprising:
    displaying on the display a user interface for the image capture unit;
    detecting a first device state associated with capturing a first image portion of the panoramic image;
    detecting a second device state associated with capturing a second image portion of the panoramic image, wherein the second image portion is captured after the first image portion; and
    in response to the detected first and second device states, providing at the portable device a scan guidance indicator to guide change in the second device state,
    wherein the scan guidance indicator comprises:
        an original scan line indicator corresponding to an original vertical position of the portable device determined from the first device state; and
        a scan line alignment indicator representing a movement direction relative to the original vertical position of the portable device, wherein the movement direction prompts user input to align a current vertical position of the portable device with the original vertical position of the portable device,
    wherein the scan line alignment indicator is displayed below the original scan line indicator in response to a determination that the current vertical position of the portable device is lower than the original vertical position of the portable device, and
    wherein the scan line alignment indicator is displayed above the original scan line indicator in response to a determination that the current vertical position of the portable device is higher than the original vertical position of the portable device.

2. The method of claim 1, wherein the second device state is based at least in part on a tilt sensor and a movement sensor of the portable device, and wherein the scan guidance indicator comprises an indicator selected from a group consisting of: an audible indicator, and a tactile indicator.

3. The method of claim 1, wherein the portable device display functions as a viewfinder for the image capture unit, wherein the viewfinder displays a preliminary image of the second image portion before capture, and wherein the scan guidance indicator is overlaid over the preliminary image of the second image portion.

4. A method to facilitate obtaining a panoramic image using a portable device having a display and an image capture unit, the method comprising:
    displaying on the display a user interface for the image capture unit;
    detecting a first device state associated with capturing a first image portion of the panoramic image;
    detecting a second device state associated with capturing a second image portion of the panoramic image, wherein the second image portion is captured after the first image portion; and
    in response to the detected first and second device states, providing at the portable device a scan guidance indicator to guide change in the second device state,
    wherein the scan guidance indicator comprises:
    an original scan line indicator corresponding to an original vertical position of the portable device determined from the first device state; and
    a scan line alignment indicator representing a movement direction relative to the original vertical position of the portable device, wherein the movement direction prompts user input to align a current vertical position of the portable device with the original vertical position of the portable device,
    wherein the scan line alignment indicator is displayed below the original scan line indicator in response to a determination that the current vertical position of the portable device is lower than the original vertical position of the portable device, and
    wherein the scan line alignment indicator is displayed above the original scan line indicator in response to a determination that the current vertical position of the portable device is higher than the original vertical position of the portable device:
wherein the scan line alignment indicator comprises an arrow pointing in a direction to guide change in the second device state, wherein the first device state comprises the original vertical position of the portable device at a start of a scan path, and wherein the second device state comprises a vertical position of the portable device proximately before the capturing of the second image portion.

5. A method to facilitate obtaining a panoramic image using a portable device having a display and an image capture unit, the method comprising:
displaying on the display a user interface for the image capture unit;
detecting a first device state associated with capturing a first image portion of the panoramic image;
detecting a second device state associated with capturing a second image portion of the panoramic image, wherein the second image portion is captured after the first image portion; and
in response to the detected first and second device states, providing at the portable device a scan guidance indicator to guide change in the second device state,
wherein the scan guidance indicator comprises:
an original scan line indicator corresponding to an original vertical position of the portable device determined from the first device state; and
a scan line alignment indicator representing a movement direction relative to the original vertical position of the portable device, wherein the movement direction prompts user input to align a current vertical position of the portable device with the original vertical position of the portable device,
wherein the scan line alignment indicator is displayed below the original scan line indicator in response to a determination that the current vertical position of the portable device is lower than the original vertical position of the portable device, and
wherein the scan line alignment indicator is displayed above the original scan line indicator in response to a determination that the current vertical position of the portable device is higher than the original vertical position of the portable device;
wherein the scan line alignment indicator comprises a haptic indicator that increases in intensity relative to an amount that the current vertical position of the portable device deviates from the original vertical position of the portable device.

6. A method to facilitate obtaining a panoramic image using a portable device having a display and an image capture unit, the method comprising:
displaying on the display a user interface for the image capture unit;
detecting a first device state associated with capturing a first image portion of the panoramic image;
detecting a second device state associated with capturing a second image portion of the panoramic image, wherein the second image portion is captured after the first image portion;
in response to the detected first and second device states, providing at the portable device a scan guidance indicator to guide change in the second device state, wherein the scan guidance indicator comprises:
an original scan line indicator corresponding to an original vertical position of the portable device determined from the first device state; and
a scan line alignment indicator representing a movement direction relative to the original vertical position of the portable device, wherein the movement direction prompts user input to align a current vertical position of the portable device with the original vertical position of the portable device,
wherein the scan line alignment indicator is displayed below the original scan line indicator in response to a determination that the current vertical position of the portable device is lower than the original vertical position of the portable device, and
wherein the scan line alignment indicator is displayed above the original scan line indicator in response to a determination that the current vertical position of the portable device is higher than the original vertical position of the portable device;
calculating a preferred range of scanning speeds based on a projected processor load;
determining that a scanning speed of the portable device is outside of the preferred range of scanning speeds; and
displaying, at a position other than positions along the scan guidance indicator, a non-textual visual guide on the display to guide movement of the portable device to stay within or return to the preferred range of scanning speeds.

7. The method of claim 6, wherein the non-textual visual guide comprises at least one animated visual element selected from a group of visual elements consisting of:
a first visual element that moves on the display at an increased speed relative to an amount that the scanning speed deviates from the preferred range of scanning speeds; and
a second visual element that moves away from a centerline of a currently displayed image at an increased distance relative to an amount that the scanning speed deviates from the preferred range of scanning speeds.

8. A portable device, comprising:
a display;
at least one storage device;
at least one sensor selected from a group comprising: a device motion sensor, and an orientation sensor;
an image capture unit; and
at least one processor in operable communication with the display, the at least one storage device, the at least one sensor, and the image capture unit,
wherein the storage device comprises instructions that, when executed by the at least one processor, performs operations comprising:
providing on the display, a user interface for the image capture unit;
detecting a first device state associated with capturing a first image portion of the panoramic image, wherein the first device state comprises an original vertical position of the portable device at a start of a scan path;
detecting a second device state associated with capturing a second image portion of the panoramic image, wherein the second device state comprises a vertical position of the portable device proximately before the capturing of the second image portion, wherein the second image portion is captured after the first image portion; and
in response to the detected first and second device states, providing at the portable device a scan guidance indicator to guide change in the second device state, wherein the scan guidance indicator comprises:
an original scan line indicator corresponding to the original vertical position of the portable device determined from the first device state; and
a scan line alignment indicator representing a movement direction relative to the original vertical position of the portable device, wherein the movement direction prompts user input to align a current vertical position of the portable device with the original vertical position of the portable device,
wherein the scan line alignment indicator is displayed below the original scan line indicator in response to a determination that the current vertical position of the portable device is lower than the original vertical position of the portable device, and
wherein the scan line alignment indicator is displayed above the original scan line indicator in response to a determination that the current vertical position of the portable device is higher than the original vertical position of the portable device.

9. The portable device of claim 8, wherein the scan line alignment indicator comprises a haptic indicator that increases in intensity relative to an amount that the current vertical position of the portable device deviates from the original vertical position of the portable device.

10. The portable device of claim 8,
wherein the portable device is selected from a group consisting of: a mobile telephone, a smartphone, a tablet, an multimedia playback device, a personal computer, a laptop, and a camera, and
wherein the orientation sensor is selected from a group consisting of: an angular velocity sensor, a gyroscope, and an accelerometer.

11. The portable device of claim 8, wherein the scan guidance indicator comprises an indicator selected from a group consisting of: an audible indicator, and a tactile indicator.

12. The portable device of claim 8, further comprising:
calculating a preferred range of scanning speeds based on a projected processor load;
determining that a scanning speed of the portable device is outside of the preferred range of scanning speeds; and
displaying, at a position other than positions along the scan guidance indicator, a non-textual visual guide on the display to guide movement of the portable device to stay within or return to the preferred range of scanning speeds.

13. The method of claim 12, wherein the non-textual visual guide comprises at least one animated visual element selected from a group of visual elements consisting of:
a first visual element that moves on the display at an increased speed relative to an amount that the scanning speed deviates from the preferred range of scanning speeds; and
a second visual element that moves away from a centerline of a currently displayed image at an increased distance relative to an amount that the scanning speed deviates from the preferred range of scanning speeds.

14. A non-transitory, machine-readable medium including instructions that, when executed by a processor, cause the processor of a portable device to perform operations comprising:
displaying a user interface on a display of the portable device, the user interface for an image capture unit of the portable device;
determining a sensor indication of a first device state associated with obtaining a first image portion of a panoramic image;
detecting a sensor indication of a second device state associated with capturing a second image portion of the panoramic image, wherein the second image portion is captured after the first image portion; and
in response to the detected first and second device states, providing at the portable device a scan guidance indicator to guide change in the second device state,
wherein the scan guidance indicator comprises:
an original scan line indicator corresponding to an original vertical position of the portable device determined from the first device state; and
a scan line alignment indicator representing a movement direction relative to the original vertical position of the portable device, wherein the movement direction prompts user input to align the current vertical position of the portable device with the original vertical position of the portable device, and
wherein the scan line alignment indicator is displayed below the original scan line indicator in response to a determination that the current vertical position of the portable device is lower than the original vertical position of the portable device, and
wherein the scan line alignment indicator is displayed above the original scan line indicator in response to a determination that the current vertical position of the portable device is higher than the original vertical position of the portable device.

15. The computer readable medium of claim 14, wherein the scan guidance indicator comprises an indicator selected from a group consisting of: an audible indicator, and a tactile indicator.

16. The computer readable medium of claim 14, wherein the scan line alignment indicator comprises an arrow pointing in a direction to guide change in the second device state, wherein the first device state comprises the original vertical position of the portable device at a start of a scan path, and wherein the second device state comprises a vertical position of the portable device proximately before the capturing of the second image portion.

17. The computer readable medium of claim 14, wherein the scan line alignment indicator comprises a haptic indicator that increases in intensity relative to an amount that the current vertical position of the portable device deviates from the original vertical position of the portable device.

* * * * *